(12) United States Patent
Francois et al.

(10) Patent No.: US 12,731,272 B2
(45) **Date of Patent: *Sep. 8, 2026**

(54) THREE-DIMENSIONAL STABILIZED 360-DEGREE COMPOSITE IMAGE CAPTURE

(71) Applicant: Carvana, LLC, Tempe, AZ (US)

(72) Inventors: Bruno Francois, Atlanta, GA (US); Grant Schindler, Atlanta, GA (US)

(73) Assignee: Carvana, LLC, Tempe, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/901,317

(22) Filed: Sep. 30, 2024

(65) Prior Publication Data

US 2025/0022150 A1 Jan. 16, 2025

Related U.S. Application Data

(63) Continuation of application No. 18/126,972, filed on Mar. 27, 2023, now Pat. No. 12,106,495, which is a (Continued)

(51) Int. Cl.

*G06T 7/33* (2017.01)
*G06F 3/0484* (2022.01)

(Continued)

(52) U.S. Cl.

CPC .............. *G06T 7/33* (2017.01); *G06F 3/0484* (2013.01); *G06T 3/4007* (2013.01); *G06T 7/246* (2017.01);

(Continued)

(58) Field of Classification Search

CPC ........ G06V 10/40; G06V 10/48; G06V 20/56; H04N 23/62; H04N 23/631; H04N 23/64;

(Continued)

(56) References Cited

U.S. PATENT DOCUMENTS

| | | | |
|---|---|---|---|
| 5,694,533 | A | 12/1997 | Richards et al. |
| 5,973,733 | A | 10/1999 | Gove |

(Continued)

FOREIGN PATENT DOCUMENTS

| | | | |
|---|---|---|---|
| JP | 2006224927 | A | 8/2006 |
| JP | 4971615 | B2 | 7/2012 |
| WO | 2005084405 | A2 | 9/2005 |

OTHER PUBLICATIONS

In Re Venner et al., No. 6391, LexisNexis; United States Court of Customs and Patent Appeals; Oral argument Nov. 7, 1958, Dec. 19, 1958.

(Continued)

*Primary Examiner* — Behrooz M Senfi
(74) *Attorney, Agent, or Firm* — SNELL & WILMER L.L.P.

(57) ABSTRACT

The system may determine a direction of gravity in each image of a sequence of images around an object; estimate a center of mass of the object in each image of the sequence of images using the direction of gravity and dimensions of the object; stabilize each image in the sequence of images using the center of mass; and generate a 360 degree display of the object using each image in the stabilized sequence of images.

20 Claims, 31 Drawing Sheets

Related U.S. Application Data continuation of application No. 17/403,064, filed on Aug. 16, 2021, now Pat. No. 11,616,919, which is a continuation of application No. 16/404,335, filed on May 6, 2019, now Pat. No. 11,095,837, which is a continuation of application No. 15/711,055, filed on Sep. 21, 2017, now Pat. No. 10,284,794, which is a continuation-in-part of application No. 14/947,842, filed on Nov. 20, 2015, now Pat. No. 9,998,663.

(60) Provisional application No. 62/100,546, filed on Jan. 7, 2015.

(51) Int. Cl.

| | |
|---|---|
| ***G06T 3/4007*** | (2024.01) |
| ***G06T 7/246*** | (2017.01) |
| ***G06V 10/40*** | (2022.01) |
| ***G06V 10/48*** | (2022.01) |
| ***G06V 20/56*** | (2022.01) |
| ***H04N 23/62*** | (2023.01) |
| ***H04N 23/68*** | (2023.01) |
| ***H04N 23/698*** | (2023.01) |
| ***H04N 25/40*** | (2023.01) |

(52) U.S. Cl.

CPC .............. *G06V 10/40* (2022.01); *G06V 10/48* (2022.01); *G06V 20/56* (2022.01); *H04N 23/62* (2023.01); *H04N 23/68* (2023.01); *H04N 23/698* (2023.01); *H04N 25/41* (2023.01); *G06T 2200/32* (2013.01); *G06T 2207/30244* (2013.01)

(58) Field of Classification Search

CPC ...... H04N 23/68; H04N 23/698; H04N 25/41; G06T 2200/32; G06T 2207/30244; G06T 3/4007; G06T 7/246; G06T 7/33

USPC ........................................................ 348/218.1

See application file for complete search history.

(56) References Cited

U.S. PATENT DOCUMENTS

| | | | |
|---|---|---|---|
| 6,901,384 | B2 | 5/2005 | Lynch et al. |
| 6,950,807 | B2 | 9/2005 | Brock |
| 7,119,837 | B2 | 10/2006 | Soupliotis et al. |
| 7,149,345 | B2 | 12/2006 | Fujiwara |
| 7,272,255 | B2 | 9/2007 | Ishiyama |
| 7,394,977 | B2 | 7/2008 | Park et al. |
| 7,433,497 | B2 | 10/2008 | Chen |
| 7,548,236 | B2 | 6/2009 | Ikezawa |
| 7,548,659 | B2 | 6/2009 | Ofek et al. |
| 7,557,832 | B2 | 7/2009 | Lindenstruth et al. |
| 7,558,405 | B2 | 7/2009 | Tico et al. |
| 7,605,845 | B2 | 10/2009 | Batur |
| 7,705,885 | B2 | 4/2010 | Prieto et al. |
| 7,817,181 | B2 | 10/2010 | Lee |
| 8,054,335 | B2 | 11/2011 | Deng et al. |
| 8,072,496 | B2 | 12/2011 | Antsfeld |
| 8,134,603 | B2 | 3/2012 | Auberger et al. |
| 8,194,141 | B2 | 6/2012 | Narasimha et al. |
| 8,385,732 | B2 | 2/2013 | Zuniga et al. |
| 8,488,010 | B2 | 7/2013 | Voss et al. |
| 8,494,058 | B2 | 7/2013 | Chang et al. |
| 8,508,605 | B2 | 8/2013 | Dolgin et al. |
| 8,520,084 | B2 | 8/2013 | Tsai et al. |
| 8,531,535 | B2 | 9/2013 | Kwatra et al. |
| 8,553,096 | B2 | 10/2013 | Proca et al. |
| 8,558,903 | B2 | 10/2013 | Liu et al. |
| 8,648,919 | B2 | 2/2014 | Mantzel et al. |
| 8,743,222 | B2 | 6/2014 | Hamalainen |
| 8,773,542 | B2 | 7/2014 | Jiang et al. |
| 8,791,414 | B2 | 7/2014 | Wang et al. |
| 8,797,414 | B2 | 8/2014 | Park et al. |
| 8,872,927 | B2 | 10/2014 | Proca et al. |
| 8,890,962 | B2 | 11/2014 | Proca et al. |
| 8,896,713 | B2 | 11/2014 | Corey et al. |
| 8,923,400 | B1 | 12/2014 | Alvarez et al. |
| 8,941,743 | B2 | 1/2015 | Petrescu et al. |
| 8,947,546 | B2 | 2/2015 | Foster et al. |
| 9,300,871 | B2 | 3/2016 | Zhou et al. |
| 9,300,873 | B2 | 3/2016 | Zhou et al. |
| 9,525,821 | B2 | 12/2016 | Chang |
| 9,596,411 | B2 | 3/2017 | Thivent et al. |
| 9,609,209 | B2 | 3/2017 | Lee et al. |
| 9,998,663 | B1 | 6/2018 | François et al. |
| 10,192,122 | B2 | 1/2019 | Yoshida et al. |
| 10,284,794 | B1 * | 5/2019 | Francois .................. G06T 7/33 |
| 11,095,837 | B2 * | 8/2021 | Francois ................ G06T 7/246 |
| 11,616,919 | B2 * | 3/2023 | Francois ............... H04N 25/41 348/36 |
| 12,106,495 | B2 * | 10/2024 | Francois ............... H04N 23/68 |
| 2002/0082860 | A1 | 6/2002 | Johnson |
| 2002/0085219 | A1 | 7/2002 | Ramamoorthy |
| 2002/0105513 | A1 | 8/2002 | Chen |
| 2007/0011083 | A1 | 1/2007 | Bird et al. |
| 2007/0076982 | A1 | 4/2007 | Petrescu |
| 2007/0171987 | A1 | 7/2007 | Trimeche |
| 2007/0172216 | A1 | 7/2007 | Lai |
| 2007/0248167 | A1 | 10/2007 | Park |
| 2008/0143840 | A1 | 6/2008 | Corkum et al. |
| 2008/0165280 | A1 | 7/2008 | Deever et al. |
| 2009/0066800 | A1 | 3/2009 | Wei |
| 2009/0140887 | A1 | 6/2009 | Breed et al. |
| 2009/0160930 | A1 | 6/2009 | Ruppert |
| 2009/0167844 | A1 | 7/2009 | Seki et al. |
| 2009/0169052 | A1 | 7/2009 | Seki et al. |
| 2010/0046624 | A1 | 2/2010 | Archibald et al. |
| 2010/0208086 | A1 | 8/2010 | Kothandaraman et al. |
| 2013/0033612 | A1 | 2/2013 | Wu et al. |
| 2013/0215264 | A1 | 8/2013 | Soatto et al. |
| 2013/0307937 | A1 | 11/2013 | Kim |
| 2013/0335409 | A1 | 12/2013 | Yamamoto |
| 2013/0335490 | A1 | 12/2013 | Nagao et al. |
| 2014/0037136 | A1 | 2/2014 | Ramalingam et al. |
| 2014/0198852 | A1 | 7/2014 | Incesu et al. |
| 2014/0201126 | A1 | 7/2014 | Zadeh et al. |
| 2014/0232748 | A1 | 8/2014 | Kis et al. |
| 2015/0022677 | A1 | 1/2015 | Guo et al. |
| 2015/0084951 | A1 | 3/2015 | Boivin et al. |
| 2016/0028967 | A1 | 1/2016 | Sezer et al. |
| 2016/0088287 | A1 | 3/2016 | Sadi et al. |
| 2016/0127641 | A1 | 5/2016 | Gove |
| 2016/0328827 | A1 | 11/2016 | Ilic et al. |
| 2020/0082504 | A1 | 3/2020 | Saporta et al. |

OTHER PUBLICATIONS

Credit Acceptance Corp, Guaranteed Credit Approval, Auto Loan; http://www.insider-car-buying-tips.com/credit_acceptance_corp.html; accessed Dec. 17, 2013.

Auto Success; Credit Acceptance's Upgraded Credit Approval Processing System Simplifies Approval Process; vol. 1 Issue 33; http://www.imakenews.com/autosuccess/e_article001075242.cfm?x=bgB6V1j,b7jJcq29,w; accessed Dec. 17, 2013.

Credit Acceptance Corp (CACC.OQ) Company Profile I Reuters.com; http://www.reuters.com/finance/stocks/companyProfile?symbol=CACC.OQ; accessed Dec. 17, 2013.

Credit Acceptance Corporation—Annual Report; United States Securities and Exchange Commission; Washington D.C. 20549; Form 10-K; Annual Report Pursuant to Section 13 or 15(d) of the Securities Exchange Act of 1934. http://www.ir.creditacceptance.com/secfiling.cfm?filing1D=885550-13-18&CIK=885550; accessed Dec. 17, 2013.

* cited by examiner

1600

1700

1800

1900

2000

2100

2200

2700

2800

THREE-DIMENSIONAL STABILIZED 360-DEGREE COMPOSITE IMAGE CAPTURE

CROSS-REFERENCE TO RELATED APPLICATIONS

This application is a continuation of, and claims priority to, U.S. patent application Ser. No. 18/126,972 filed on Mar. 27, 2023 and entitled "Three-Dimensional Stabilized 360-Degree Composite Image Capture." U.S. patent application Ser. No. 18/126,972 is a continuation of U.S. patent application Ser. No. 17/403,064 filed on Aug. 16, 2021 and entitled "Three-Dimensional Stabilized 360-Degree Composite Image Capture." U.S. patent application Ser. No. 17/403,064 is a continuation of U.S. patent application Ser. No. 16/404,335 filed on May 6, 2019 and entitled "Three-Dimensional Stabilized 360-Degree Composite Image Capture." U.S. patent application Ser. No. 16/404,335 is a continuation of U.S. patent application Ser. No. 15/711,055 filed on Sep. 21, 2017 and entitled "Three-Dimensional Stabilized 360-Degree Composite Image Capture." U.S. patent application Ser. No. 15/711,055 is a continuation-in-part of and claims priority to U.S. patent application Ser. No. 14/947,842 filed on Nov. 20, 2015 and entitled "Surround Image Capture and Processing." U.S. patent application Ser. No. 14/947,842 is a non-provisional of U.S. Provisional Patent Application No. 62/100,546 filed on Jan. 7, 2015 and entitled "A Method for Creating Smoothly Rotating 360 Degree Visualizations of Cars by Capturing Images on a Mobile Device Equipped with Inertial Sensors." All of which are herein incorporated by reference in their entireties for all purposes, including but not limited to those portions that specifically appear hereinafter, but except for any subject matter disclaimers or disavowals, and except to the extent that the incorporated material is inconsistent with the express disclosure herein, in which case the language in this disclosure shall control.

FIELD

The present disclosure is generally related to image capture and image processing, and more particularly to image capture and processing to produce a stabilized, three-dimensional, 360-degree composite image of an object formed from a plurality of images of the object captured at different angles.

BACKGROUND

Capturing a 360 degree composite image of an object can be difficult and expensive. Combining captured images into a smooth image without specialized equipment, such as cameras mounted to a rail extending around an object, or a fixed camera directed at an object on a rotating table, can present great difficulties.

SUMMARY

Many embodiments can include a system. The system can comprise one or more processors and one or more memories. The one or more memories can be coupled to the cone or more processors and can include instructions that, when executed by the one or more processors, cause the one or more processors to fit one or more planes using a set of camera positions for a surround image of a vehicle; determine a direction of gravity using the one or more planes; and stabilize one or more images in the surround image of the vehicle using the direction of gravity.

Various embodiments can comprise a method. The method can comprise fitting, using one or more processors, one or more planes using a set of camera positions for a surround image of a vehicle; determining, using one or more processors, a direction of gravity using the one or more planes; and stabilizing, using one or more processors, one or more images in the surround image of the vehicle using the direction of gravity.

Some embodiments can include an article of manufacture. The article of manufacture can include one or more non-transitory, tangible computer readable storage mediums. The one or more non-transitory, tangible computer readable storage mediums can have instructions stored thereon that, in response to execution by one or more processors, cause the one or more processors to perform operations. The operations can comprise fitting one or more planes using a set of camera positions for a surround image of a vehicle; determining a direction of gravity using the one or more planes; and stabilizing one or more images in the surround image of the vehicle using the direction of gravity.

Many embodiments can comprise a system. The system can comprise a processor and a memory coupled to the processor. The memory can include instructions that, when executed by the processor, cause the processor to: determine a direction of gravity in each image of a sequence of images around an object; estimate a center of mass of the object in each image of the sequence of images using the direction of gravity and dimensions of the object; stabilize each image in the sequence of images using the center of mass; and generate a 360 degree display of the object using each image in the stabilized sequence of images.

Various embodiments can comprise a method. The method can comprise determining a direction of gravity in each image of a sequence of images around an object; estimating a center of mass of the object in each image of the sequence of images using the direction of gravity and dimensions of the object; stabilizing each image in the sequence of images using the center of mass; and generating a 360 degree display of the object using each image in the stabilized sequence of images.

Some embodiments can comprise an article of manufacture. The article of manufacture can include a non-transitory, tangible computer readable storage medium. The non-transitory, tangible computer readable storage medium having instructions stored thereon that, in response to execution by a processor, cause the processor to perform operations comprising: determining a direction of gravity in each image of a sequence of images around an object; estimating a center of mass of the object in each image of the sequence of images using the direction of gravity and dimensions of the object; stabilizing each image in the sequence of images using the center of mass; and generating a 360 degree display of the object using each image in the stabilized sequence of images.

Many embodiments can comprise a system. The system can comprise one or more processors and one or more storage devices. The one or more storage devices can be configured to store computing instructions that, when executed, cause the processor to receive a plurality of images of an object, the plurality of images comprising different views of the object from around the object; iteratively align one or more images within one or more subsets of the plurality of images until the object is aligned from image to image within the one or more subsets of the plurality of images; and selectively align respective images of the one or more subsets to each other to produce a surround image.

Various embodiments can comprise a method. The method can be implemented via execution of computing instructions configured to run at one or more processors and stored at one or more storage devices. The method can comprise receive a plurality of images of an object, the plurality of images comprising different views of the object from around the object; iteratively align one or more images within one or more subsets of the plurality of images until the object is aligned from image to image within the one or more subsets of the plurality of images; and selectively align respective images of the one or more subsets to each other to produce a surround image.

In some embodiments, a device may include a processor and a memory. The memory may include instructions that, when executed, may cause the processor to generate a 360 degree three-dimensional composite image formed from a stabilized sequence of images of an object taken along a closed loop path about the object. In some embodiments, the instructions may cause the processor to rotate the 360 degree three-dimensional composite image about any selected point on the object. Further, in some embodiments, the instructions may cause the processor to provide an interface configured to enable a user to select a feature on the 360 degree three-dimensional composite image and to associate information with the selected feature.

In some aspects, the device may include instructions that can cause the processor to identify the boundaries or edges of the object within each image of a sequence of images and to remove background elements from each image that correspond to pixels that fall outside of the boundaries or edges of the object. Further, in some aspects, the device may include instructions that can cause the processor to add features or alter or replace colors of the object or portions of the object in the 360 degree three-dimensional composite image in response to user input.

In some embodiments, the device may include a gyroscope sensor circuit and a display, both of which are coupled to the processor. The device may provide an interface to the display that includes instructions for capturing images to produce the 360 degree three-dimensional composite image. The device may automatically capture images as the user moves the camera around the object. Further, the device may display a progress meter to the display to assist the user in the image capture process. Further, the device may provide alignment aids to assist the user in aligning the object within the view area to provide consistent image capture and to provide an indication when the user's orientation of the camera changes by more than a threshold amount. Further, the device may automatically terminate the image capture process when the gyroscope sensor indicates that the camera has traversed a selected amount of the closed loop path. Other embodiments are also possible.

In some embodiments, the device may include instructions that, when executed, may cause the processor to correlate the 360 degree three-dimensional composite image to a computer model of the image. Further, the device may include an interface through which a user may add features, alter colors, or otherwise adjust selected elements of the 360 degree three-dimensional composite image. In some embodiments, the device may be configured to provide an automated tour of the object by automatically selecting and rotating about the object and features of the object. In some aspects, the device may display associated information while rotating about the selected feature.

In some embodiments, a device may include a processor and a memory. The memory may include instructions that, when executed, may cause the processor to determine a direction of gravity in each image of a sequence of images taken along a closed loop path around an object and to determine a center of mass of the object in each image. The processor may selectively apply a transformation (such as an affine transformation or projective transformation) to each image of the sequence of images to stabilize feature points associated with the object in the sequence of images such that a three-dimensional line segment passing through the center of mass of the object and parallel to the direction of gravity remains fixed in each image of the sequence of images to produce a stabilized sequence of images. The instructions may also cause the processor to generate a 360 degree three-dimensional composite image from the stabilized sequence of images.

In other embodiments, a device may include a processor and a memory configured to store instructions. The instructions, when executed, may cause the processor to utilize a center of mass, a gravitational vector, and a plurality of three-dimensional feature points to determine transformations (e.g., affine transformations or projective transformations) to produce rotation, scale, and translation adjustments for each image of a sequence of images, constraining adjustments to first and last images of the sequence to produce a 360-degree composite image. Further, the instructions may cause the processor to stabilize the composite image in three dimensions by aligning the gravitational vector extending through the center of mass of an object in each of the images such that the gravitational vector remains fixed. Additionally, the instructions may cause the processor to perform minor affine transformations on selected images of the sequence of images to hide empty areas that are devoid of pixels that are adjusted into the composite image by the affine transformations.

In still other embodiments, a device may include a computing device, a camera, a smart phone, or another device that may be configured to process a plurality of images of an object taken along a closed loop path around the object. The device may process the plurality of images to produce a smooth 360-degree three-dimensional composite image. In some embodiments, a user may interact with the three-dimensional composite through a graphical interface to view and rotate the image. Further, the user may select a feature within the plurality of images to apply a label or tag, and the device may be configured to associate the label or tag to the three-dimensional element within each image of the sequence of images. Other embodiments are also possible.

BRIEF DESCRIPTION OF THE DRAWINGS

In the following discussion, the same reference numbers are used in the various embodiments to indicate the same or similar elements.

DETAILED DESCRIPTION OF ILLUSTRATIVE EMBODIMENTS

Figure 1:
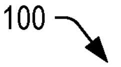
FIG. 1 depicts a diagram showing capturing of images of an object from different directions along a 360-degree path circumscribing the object, in accordance with certain embodiments of the present disclosure.
Figure 1:
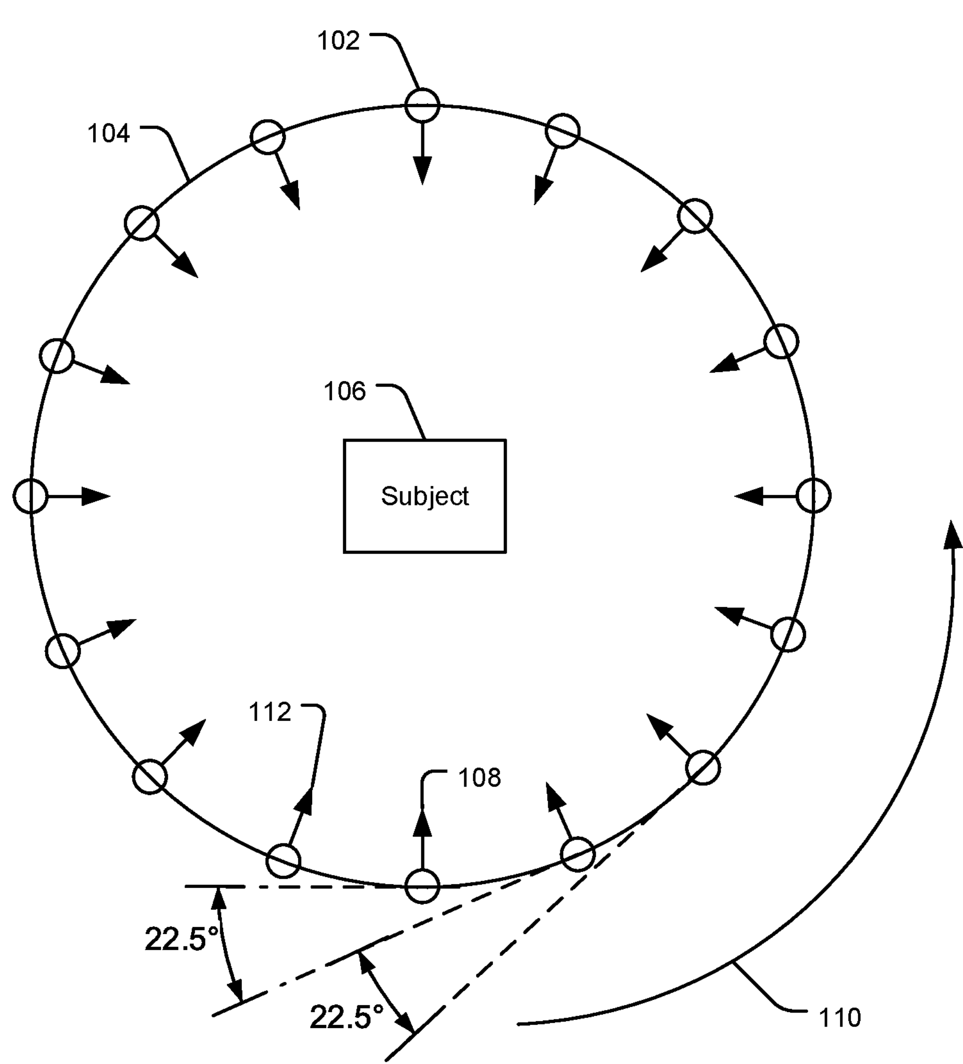

In the following detailed description of the embodiments, reference is made to the accompanying drawings which form a part hereof, and in which are shown by way of illustrations. Further, features of the various described embodiments may be combined, other embodiments may be utilized, and structural changes may be made without departing from the scope of the present disclosure.

In accordance with various embodiments, the methods and functions described herein may be implemented as one or more software programs running on a computer processor or controller circuit. In accordance with various embodiments, the methods and functions described herein may be implemented as one or more software programs executing on a computing device, such as a tablet computer, a smart phone, a personal computer, a server, or any other computing device. Alternatively, the methods and functions may be performed using dedicated hardware implementations including, but not limited to, application specific integrated circuits, programmable logic arrays, and other hardware devices. Further, the methods described herein may be implemented as a memory device, such as a non-volatile computer readable storage device (such as a hard disc drive, a flash memory device, a compact disc, or other non-volatile storage device that includes instructions that, when executed, cause a processor to perform the various operations.

There are many instances where a three hundred sixty (360)-degree representation of a photography subject may be desirable. For example, consumers may want to see what a product, such as jewelry, sculptures, automobiles, clothing, and so on, looks like from all angles. In a particular example, an automobile dealership may wish to capture 360-degree views of each vehicle in its inventory to allow potential buyers to view the automobiles from various angles. However, without the use of specialized photography equipment, such as, for example, turntables or rail mounted cameras surround composite images featuring smooth movement can be difficult to capture or produce.

A hand-held camera used to capture video (or image frames) may appear shaky or jittery due to the movement of the user (e.g. walking), hand jitter, variations in the terrain around the object, and so on. Individual image frames captured by a hand-held camera may be misaligned or otherwise erratic relative to adjacent frames in a sequence of frames. In addition, when such misaligned images are joined to produce a composite image, the composite image cannot be rotated continuously without discontinuities. One such discontinuity can correspond to the start and end points of the image capture. In some instances, due to changes in terrain or large variations in the user's path, a visible discontinuity can occur between frames or from frame to frame or across a sequence of image frames. Such discontinuities present difficulties with respect to smooth rotation of a 360-degree composite image.

Embodiments of systems, methods and devices are described below that may be used to capture a plurality of images and to process the plurality of images to produce a 360-degree composite image that may be rotated smoothly. As used herein, the phrase "composite image" refers to a synthesis, fusion, or amalgamation of a plurality of images, which have been aligned, adjusted or otherwise transformed to produce a smooth, 360-Degree, three-dimensional composite image. In some embodiments, the systems, methods and devices may provide an interface through which a user may interact with the composite image, for example, to rotate the image to see the object from multiple angles.

Further, embodiments of the methods and devices described below may be configured to join a first image and a last image of a set of surround images (images taken from different angles along a path forming a complete circuit around an object) in order to create a seamless and continuously rotatable composite image that is not limited by set starting and stopping positions. In some embodiments, the 360-degree composite image may be captured and processed by the camera device (such as a smart phone, a tablet computing device, or another image processing device), without the need for post-processing or editing by a separate computing device.

Further, embodiments of systems, methods and devices are described below that may be used to capture a plurality of images and to process the plurality of images to produce a 360-degree three-dimensional, composite image that may be rotated smoothly. In some embodiments, the systems, methods, and devices described below may be configured to track feature points in a sequence of images that define a complete circuit around an object (i.e., images taken of the object as the image source traverses a 360 path around the object). Further, embodiments of the systems, methods, and devices may be configured to identify affine transformations or other homographies/projective transforms to apply to each image to stabilize the object in the images, such that a three-dimensional (3D) line segment passing through the center of mass of the object (and perpendicular to the ground) remains fixed in all of the images. The systems, methods, and devices may be configured to determine a six-degrees-of-freedom (6 DOF) pose (rotation and translation in a global coordinate frame) of the image source that captured the image. Further, the systems, methods, and devices can be configured to determine the 3D location of the center of mass of the object and a 3D vector describing the direction of gravity in the image. The 6 DOF pose, the center of mass, and the 3D vector may be used to smoothly transform the frames, removing hidden elements and excessive shifts, to produce a smooth, 360 degree, 3D composite image of an object from a plurality of images.

In some embodiments, empty image areas are hidden. In an example, the affine transformations or other homographies/projective transforms that stabilize the 3D line segment through the center of an object, such as the automobile, can rotate or translate the images so much that image areas that are devoid of pixels are brought into view. In such instances, the systems, methods, and devices may be configured to determine a minor affine transformation or other transform of scale-only or scale-and-translation to apply to each frame so that no empty areas are visible in the final set of transformed stabilized images.

Additionally, in certain embodiments, the systems, methods, and devices may be configured to enable a user to indicate a 3D point of interest on the object by selecting a 2D position in any of the images and to apply a tag to the 3D point, which tag may be a text label or other feature that can track the 3D point through multiple images forming the 3D composite image. In an example, the systems, methods, and devices can be configured to determine a 3D geometrical description of the object (such as a list of 3D geometric shapes describing the surface of the object as a polygon mesh) from the images. Further, the systems, methods, and devices may be configured to identify parts of the objects in three dimensions, which can be used to further aid in stabilization. In some examples, data may be embedded within the image or frame that can be presented in response to selection of one of the identified parts. One possible example of a system configured to provide 3D stabilization is described below with respect to FIG. 1.

FIG. 1 is a block diagram of a system 100 configured to perform image capture and processing, in accordance with certain embodiments of the present disclosure. In some embodiments, the system 100 may include a camera device 102, such as a smart phone, a tablet computer, a digital camera, or other digital image capture device. In the depicted embodiment, the camera device 102 can be moved along a path 104 around a photography subject 106 (or object to be photographed). In some embodiments, the path 104 may be a closed loop path about the subject 106. In some examples, the path 104 may be substantially circular or elliptical. While the illustrated embodiment depicts a circular path 104, it should be appreciated that the system 100 may be configured to produce a stabilized, 360-Degree, 3D composite image of an object.

In some embodiments, the camera device 102 may include a plurality of instructions that, when executed, may cause a processor to capture a plurality of images of a subject 106 while monitoring motion and orientation parameters as the camera device 102 is moved along the path 104. In some embodiments, the camera device 102 may detect when the plurality of images represents a surround view of the subject 106.

In some embodiments, the camera device 102 may begin capturing images of the subject at a first position 108. The camera device 102 may be moved from the first position 108 along the path 104, around the subject 106, and back to approximately the first position 108. In some embodiments, the camera device 102 may be moved in a counter-clockwise direction indicated by arrow 110. In other embodiments, the camera device 102 may be moved in the opposite direction. Further, the path 104 may be circular, elliptical, or irregular.

As the camera device 102 is moved, the camera device 102 may capture a plurality of images of the subject 106, manually or automatically. In FIG. 1, each circle and corresponding arrow oriented toward the subject 106 may represent a position and orientation at which the camera device 102 captures a new image of the subject 106 as the camera device 102 is moved around the subject 106. The arrow extending from each circle may indicate the orientation of the camera lens of camera device 102 with respect to that particular image capture event. In some embodiments, the camera lens orientation is fixed relative to the camera device 102, and therefore the optical angle of the camera device 102 changes as the camera device 102 is moved and pivoted around the subject 106. In other instances, the camera may be held by a user, and variations in the optical angle of the camera device 102 are expected and adjusted by the system.

As described herein, the camera device 102 may include motion and orientation sensors, such as gyroscopic sensors, magnetometers, accelerometers, inclinometers, orientation sensors, other motion sensors, or any combination thereof, which may be used to determine the rotation, angular velocity and movement of the camera device 102. Angular velocity may refer to the change in rotational angle per unit of time, and may generally be expressed in degrees per second. The camera device 102 may use the sensors to determine the camera's rotational motion, changes in orientation and position, and progress along the path 104. The motion and orientation data may be stored with or correlated to each image, so that the orientation of the camera device 102 at the time of the image capture may be determined.

Once the sensor data indicates that the camera device 102 has fully or approximately fully traversed path 104 and returned to position 108 or moved past the position 108, the one or more modules may direct the camera device 102 (or the user) to cease capturing images. In some embodiments, the one or more modules may cause the camera device 102 to stop capturing images at position 112, just short of or even with the starting position 108. In some embodiments, the one or more modules may direct the camera device 102 to capture another image at approximately position 108 or just past the position 108 once a full rotation has been made.

In some embodiments, the path 104 may be irregular, and the one or more modules may direct the camera device 102 to capture images at locations that are within a threshold distance from idealized or selected angular positions along the path 104. For example, if the camera device 102 is being carried by a human operator, the path 104 is very likely to contain irregularities as the operator will have a difficult time moving in a perfectly circular path. The position of camera device 102 at point 108 at the beginning of the path 104 may not exactly correspond to the position or orientation of camera device 102 when the operator completes the circuit along the path 104. Accordingly, the one or more modules may initiate image capture with tolerances or thresholds that allow for an irregular path about the subject 106. Other embodiments are also possible.

In some embodiments, once the plurality of images of the subject 106 have been captured to complete the 360 degree circuit of the subject, the camera device 102 (or another computing device) may process at least some of the plurality of images to align the first image to a last image and to align, adjust and transform images between the first and last images to produce a smooth, stabilized, 360-degree composite image of the subject 106. An example embodiment of camera device 102 and the included modules is described below with respect to FIG. 2.

Figure 2:
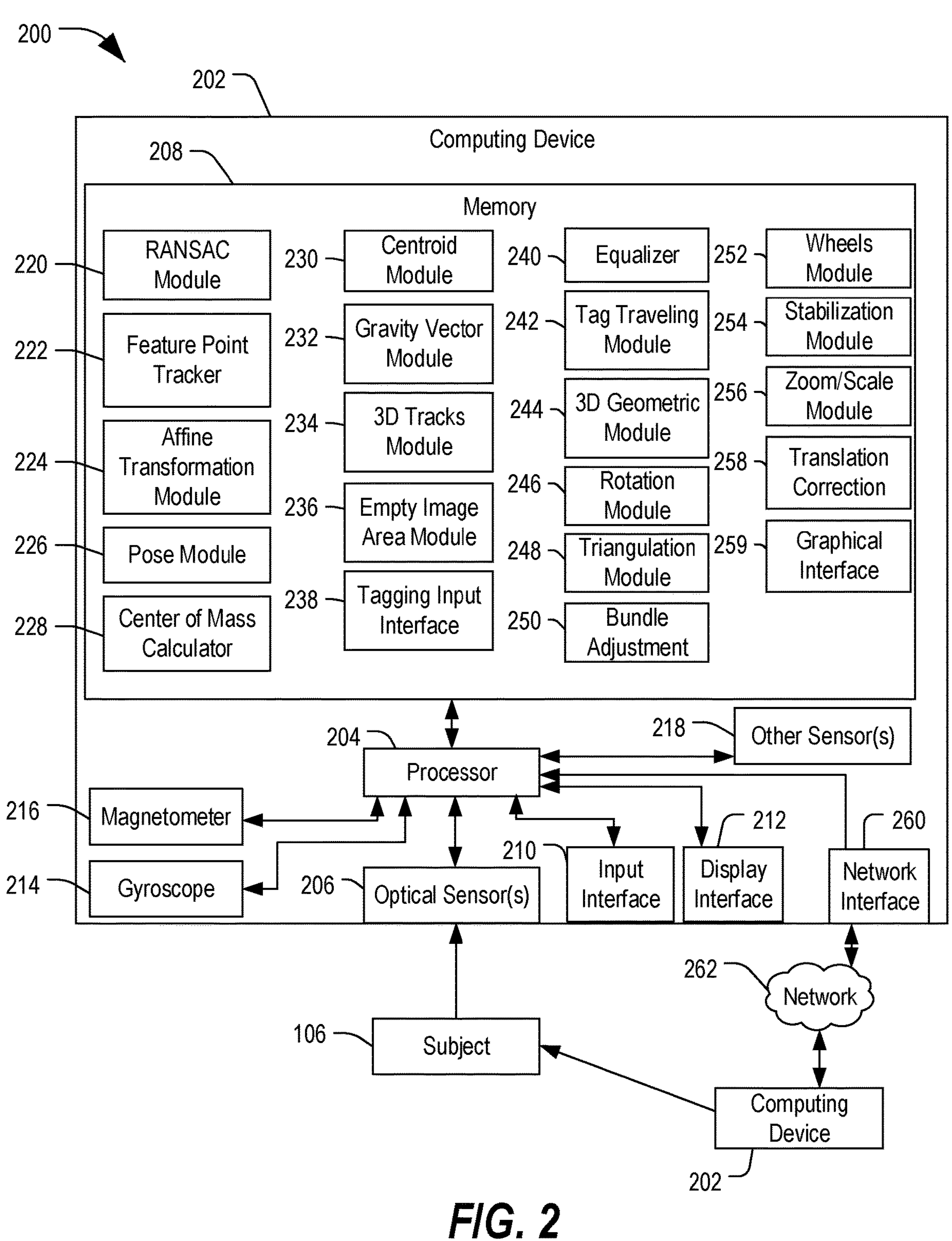
FIG. 2 depicts a block diagram of a system including a computing device configured to perform three-dimensional stabilized 360-degree image capture, in accordance with certain embodiments of the present disclosure.

FIG. 2 is a block diagram of a system 200 configured to provide 3D stabilized 360-degree composite image capture, in accordance with certain embodiments of the present disclosure. The system 200 may include a computing device 202 including a processor 204 and one or more optical sensors 206 configured to capture image data corresponding to a subject (or object) 106, such as a consumer product (e.g., an automobile, an electronic device, or another product). In an example, the computing device 202 may be implemented as a digital camera, a smart phone, a tablet computer, a laptop computer, a desktop computer, other computing devices, other data processing devices or circuits, or any combination thereof. Alternatively, the one or more optical sensors 206 may be associated with a camera device that can be coupled to the computing device 202 to download image data. Other embodiments are also possible.

The computing device 202 may further include a memory 208 coupled to the processor 204 and configured to store data and instructions that can be executed by the processor 204. Further, the computing device 202 can include an input interface 210 and a display interface 212. In an example, the input interface 210 may include or may be coupled to a keyboard or other input device, and the display interface 212 may include or may be coupled to a display screen, a projector, or another display device. In a particular embodiment, the input interface 210 and the display interface 212 may be combined as a touchscreen interface. Other embodiments are also possible. The computing device 202 may also include a plurality of sensors, including one or more gyroscopes 214, one or more magnetometers 216, and one or more other sensors 218 (such as accelerometers, light sensors, and so on). Further, the computing device 202 may include a network interface 260, which may be configured to communicate with another computing device 202 through a network 262, such as a local area network or a wide area network (e.g., the Internet).

The memory 208 can include a RANSAC (Random Sample Consensus) module 220 that, when executed, may cause the processor 204 to iteratively estimate parameters of a mathematical model of an object within an image from a set of observed data that contains outliers, when outliers are to be accorded no influence on the values of the estimates.

In some embodiments, the RANSAC module 220 may cause the processor 204 to randomly select sample sets of pixels and to process the sets of pixels to identify two-dimensional (2D) feature points within each image of a sequence of images. The 2D feature points may include sets of pixels of the image data that have a high contrast relative to nearby pixels, which contrast may represent a feature, contour, or element of the subject 106. In a photograph of an automobile, such 2D feature points can include the edges of windows, the side view mirrors, tires, contours, and so on. The RANSAC module 220 may further cause the processor 204 to process the selected 2D feature points across adjacent images to determine whether selected 2D feature points track across multiple images. The RANSAC module 220 may cause the processor 204 to iteratively process the sequence of images to identify a plurality of 2D feature points that can be tracked across a pre-determined number of images of the sequence of images.

The memory 208 may further include a feature point tracker 222 that, when executed, may cause the processor 204 to determine tracks for selected 2D feature points and to process and store the identified 2D feature points that satisfy one or more parameters. The memory 208 may also include an affine transformation module 224 that, when executed, may cause the processor 204 to determine an affine transformation to apply to each image. In some embodiments, selective application of the determined affine transformations may stabilize the subject (or object) 106 across a sequence of images such that a 3D line segment passing through a center of mass of the subject 106 (and perpendicular to the ground) remains fixed in all images. In some embodiments, the affine transformation module 224 may apply homographies/projective transforms configured to perform affine transformations and other types of transformations, depending on the implementation. For example, the module 224 may use projective transformations (sometimes called homographies) to resolve distortions and optionally to stabilize images in the sequence. In the following discussion, the methods, systems, and devices assume the use of affine transformations for simplicity. However, it should be understood that other transforms can also be used, in conjunction with or in lieu of the affine transformations. In a particular example, the system may selectively apply transforms to each of the images, where the selected transform may be selected from an affine transform, a minor affine transform, a projective transform (e.g., a homographic transformation), another type of transform, or any combination thereof In some embodiments, the feature point tracker 222 may identify and track feature points within the captured images that may represent comparison points. For example, the feature point tracker 222 may use computer vision algorithms to select points or pixels within an image relative to other points or pixels that may be distinctive based on color, brightness, contrast, surrounding shapes or patterns, or based on other parameters. In certain examples, if no feature points can be detected within a given frame, the absence of feature points may also be used as an indication that a particular frame is too blurry.

In some embodiments, the feature point tracker 222 may determine coordinates of each selected point within an image (e.g., X and Y coordinates of pixels of the selected point), other attributes of the selected points (e.g., color value of the selected point), or other data, and may store the determined information as metadata associated with the particular image. Further, the feature point tracker 222 may determine selected points that can be tracked between sets of successive images (e.g., a number of successive frames or images, such as 10 successive frames). In some embodiments, the feature point tracker 222 may determine whether points with X,Y coordinates, colors, contrast, surrounding features, or other identifying details can be located in a next frame that substantially corresponds to one or more preceding frames. If a selected point cannot be tracked for a selected number of successive frames, the feature point tracker 222 may discard the selected point as a poor feature point for tracking purposes. In some embodiments, the feature point tracker 222 may also calculate a distance and a direction that a selected feature point moves from one image to a next image, or from one image to another non-successive image (e.g. three images away, or ten images away, etc.). The distance and direction information corresponding to the movement of the selected point between frames or images may be called "tracks". The tracks may also be extended from image to image and joined together or "chained" to form longer tracks (e.g. the track between a first feature in frame 1 and the same feature in frame 2 may be joined to form a track from frame 1 to frame 2. Other embodiments are also possible.

In some embodiments, the feature point tracker 222 may employ first parameters to determine feature points within adjacent frames and from frame to frame, and may employ second parameters to determine corresponding feature points between image frames corresponding to the beginning of the image capture operation and image frames corresponding to the end of the image capture operation. In some embodiments, the second parameters may be more lenient than the first parameters. For example, there is a greater likelihood of substantial variation between images captured when a user begins a circular path and when the user arrives back at an ending position near the starting point at the end of the path as compared to images captured as the user moves along the path about the object. In an example, the camera device or computing device that includes the camera or optical sensors may be closer to or farther from the subject, at a different height, at a slightly different angle, or rotated in the last frame as compared to the first frame. The captured images may also include other differences. Accordingly, points that may be discarded as too dissimilar between immediately successive frames may be sufficiently similar to use to join the beginning and end of the sequence of images.

The affine transformation module 224 may cause the processor 204 to perform image manipulation based on the determined feature points and tracks. In some embodiments, the affine transformation module 224 may calculate and apply affine transformations (e.g. rotation, translation, scaling, skew, warp, etc.) to some or all images in the captured image sequence. An affine transformation is a class of linear 2-D geometric transformations that may be used to map variables (e.g. pixel intensity values located at position (x1, y1) in an input image) into new variables (e.g. (x2, y2) in an output image) by applying a linear combination of translation, rotation, scaling, or shearing (i.e. non-uniform scaling in some directions) operations, or any combination thereof. In some embodiments, the affine transformation module 224 may cause the processor to select one or more affine transformations to align the transformed feature point tracks from image to image, allowing the adjacent images to be as smooth as possible. For example, images may be translated up or down depending on changes in a height of the camera device between images. Similarly, at least some of the images may be scaled (e.g. zoomed in or out) based on changes in distance between the camera device and the subject or object during traversal of the 360-degree path, causing the path to be irregular. Images may be skewed if the orientation of the camera device changes relative to the subject. Other embodiments are also possible.

Once the images have been processed, the affine transformation module 224 may combine the individual image frames to form the smooth, 360 degree, 3D composite image. For example, the images may be combined into a file configured to display one frame at a time, with the final captured or processed frame of the set proceeding without interruption to the first captured or next processed frame. In some embodiments, the composite image may be presented within an interface (such as a graphical user interface) through which the composite image may be interactive. For example, a user may use a touch screen interface (e.g. display interface 212 and input interface 210) to rotate the composite image in one direction or another direction, causing the interface to present images of the composite image in a smooth manner. Further, the user may interact with the input interface 210 to zoom in or zoom out, to rotate, or to otherwise interact with the composite image. For example, if the images depict a composite image of an automobile, a user may drag his or her finger across the screen to "spin" the composite image of the automobile in either direction.

The memory 208 may further include a pose module 226 that, when executed, may cause the processor 204 to determine a six-degrees-of-freedom (6 DOF) pose (including rotation and translation in a global coordinate frame) of each camera that captured an image. The memory 208 may also include a center of mass calculator 228 that, when executed may cause the processor 204 to determine a 3D location of a center of mass of the subject 106 within the images. The memory 208 may also include a centroid module 230 that, when executed, may cause the processor 204 to determine a centroid of the subject 106 within the photograph or a centroid of a center of the camera focus across multiple images.

The memory 208 may further include a 3D tracks module 234 that, when executed, may cause the processor 204 to chain the 2D tracks determined from the feature point tracker into tracks that cross as many frames as possible. If any frame has zero tracks of at least three-frames in length passing through it, the 3D tracks module 234 may cause the processor 204 to find feature tracks that skip over this frame by tracking between non-consecutive frames that are the neighbors of the "bad" frame.

The memory 208 may also include an empty image area module 236 that, when executed, may cause the processor 204 to determine when image areas that are devoid of pixels are brought into view. In response to determining when an empty image area is brought into view, the empty image area module 236 may cause the processor 204 to utilize the affine transformation module 224 to determine a minor affine transformation of scale-only, translation-only, or scale-and-translation to apply to each frame so that no empty areas are visible in the final set of affine transformed stabilized images.

The memory 208 may further include a tagging input interface 238 that, when executed, may cause the processor 204 to receive a selection indicating 3D points of interest on the subject 106 within at least one of the images by selecting a 2D position in any of the images. The user may utilize a pointer, a stylus, a mouse, or his or her finger (through a touchscreen interface or via the input interface 210) to select the 2D position on an image. The memory 208 may further include a 3D geometric module 244 that, when executed may cause the processor 204 to determine a list of 3D geometric shapes (such as triangles) describing the surface of the subject 106 within the images. For example, for images of a vehicle, the 3D geometric module 244 may cause the processor 204 to determine a list of 3D geometric shapes providing a geometrical description of the surface of the vehicle from the images. The 3D geometric module 244 may also cause the processor 204 to identify parts of the subject 106, such as parts of the vehicle in 3D, such as wheels, which identification can further aid in stabilization.

The memory 208 can include an equalizer 240 that, when executed, may cause the processor 204 to perform histogram equalization on each image in order to minimize the effect of sun glare on tracking performance. By performing histogram equalization, sun glare effects may be reduced to facilitate feature tracking across multiple images.

Further, the memory 208 can include a tag tracking module 242 that, when executed, may cause the processor 204 to utilize the list of 3D geometric shapes from the 3D geometric module 244 and the input received by the tagging input interface 238 to determine a selected 3D element within an image of the subject 106 and to track the selected 3D element across images within a sequence of images.

The memory 208 can include a rotation module 246 that, when executed, may cause the processor 204 to determine gyroscope 214 and magnetometer sensor readings to estimate both rotation of each camera (corresponding to each captured image) and the location of each camera on the surface of a virtual sphere surrounding the subject 106. For a given 3D rotation, there is one location on a unit sphere for which the z-axis of a camera positioned there would point at the center of the sphere, where it is initially assumed that the subject 106 to be located. The memory 208 may further include a triangulation module 248 that, when executed, may cause the processor 204 to utilize the initial camera estimates and a known focal length for the camera to triangulate an initial estimate for each 3D point from its 2D observations. The triangulation module 248 may further cause the processor 204 to reject 3D points when they triangulate to locations behind the cameras in which they were observed.

The memory 208 may further include a bundle adjustment module 250 that, when executed, may cause the processor 204 to adjust the 3D camera poses and 3D point locations in order to minimize the re-projection errors. The re-projection error refers to a difference between where a 2D feature track is observed in an image, and where the 2D feature track projects according to the current 3D camera and 3D point estimates, for each point in each image in which it was observed. The bundle adjustment module 250 may cause the processor 204 to remove 3D points when, at the end of the bundle adjustment process, there remains a re-projection error greater than a threshold error. After removal, the bundle adjustment module 250 may cause the processor 204 to run a final round of bundle adjustment. In some embodiments, during bundle adjustment, the rotation of the first and last camera can be restrained to closely match the rotations reported by the gyro and magnetometer. At the end of this point in the pipeline, the 6 DOF camera poses are recovered, which can be used for 3D stabilization.

The memory 208 may further include a wheels module 252 that, when executed, may cause the processor 204 to identify the 3D wheels in each image and to determine a center of mass of the vehicle. In a particular embodiment, assuming that a vehicle has four wheels and that the center of mass of the vehicle passes through the centroid of the 3D locations of the four wheels of the car, the wheels module 252 may cause the processor to calculate the center of mass based on the centroid. In some embodiments, the wheels module 252 may cause the processor 204 to first detect 2D circles in each image using a Hough transform. The wheels module 252 may cause the processor 204 to perform a RANSAC procedure by randomly sampling one circle detection from each of two separate images. Based on the recovered 3D camera poses, the wheels module 252 may cause the processor 204 to triangulate a 3D point from the centers of the two circles in the two images. The wheels module 252 may cause the processor 204 to project this 3D point into each of the other images and to count how many circles were detected at the location of this re-projected point where observation of the circle at this location would be geometrically consistent in the image in which it was detected. In some embodiments, the wheels module 252 may cause the processor 204 to compute a 3D vector from the 3D wheel point to the centroid of the two camera positions in which it was initially triangulated, and then compute the 3D vector from the 3D wheel point to the camera position of the frame containing a potentially corroborating circle detection. The wheels module 252 may cause the processor 204 to determine that the observation is geometrically feasible when the dot product of these two vectors is positive. When the observation is geometrically feasible, the wheels module 252 may cause the processor 204 to determine the two detected circles can belong to wheels pointing the same direction, so they can be counted as an inlier. The identified 3D wheels with sufficient inlier support can be added to a list of candidate wheels. Then, the wheels module 252 may cause the processor 204 to perform a second random sampling procedure in which sets of four 3D wheels can be sampled from the candidate wheels. The wheels module 252 may cause the processor 204 to evaluate the group based on the type of symmetry expected in the wheels of an automobile. In an example, it is expected that the 3D distances between the two front tires and the two back tires are approximately equal. Further, it is expected that the 3D distances between the two left tires and the two right tires are approximately equal. The wheels module 252 may cause the processor 204 to pick the group of four 3D wheels that minimizes the sum of these two tire distance difference measures as the set of wheels, which best represents the 3D automobile in the scene. The centroid of these 3D wheels can then be treated as the center of mass of the car.

In some embodiments, if the wheel detection method fails to detect a set of four consistent wheels, the centroid module 230 may cause the processor 204 to assume that each image has the vehicle roughly centered in the frame and to search for an optimal 3D point which, if projected into each image, robustly minimizes the re-projection error between that 3D point's 2D projection and the absolute center of each image. In some embodiments, this optimal 3D point may be determined using bundle adjustment. In some embodiments, the RANSAC module 220 may cause the processor 204 to perform a RANSAC procedure including sampling two images at random, triangulating the 3D point that most closely projects onto their two centers of projection (using the triangulation module 248) to determine a "principal point", and then computing the re-projection error of that point into every frame. The centroid module 230 may cause the processor 204 to choose the triangulated point that minimizes the sum of the absolute value of the re-projection errors in the x and y dimension.

In some embodiments, the memory 208 may include a gravity vector module 232 that, when executed, may cause the processor 204 to determine a 3D vector describing a direction of gravity in each image of the sequence of images. In some embodiments, estimation of the direction of "down" agrees with the direction of gravity; however, if the photographer is on a steep hill, the "down" direction may not be appropriate to stabilize the images. The gravity vector module 232 may cause the processor 204 to fit a 3D plane to the set of camera positions, such that the normal of this plane should point either up or down. The normal represents an estimate of the gravity vector.

In some embodiments, the memory 208 may further include a stabilization module 254 that, when executed, can use the selected gravity vector to stabilize the 3D image. In some embodiments, when the wheels module 252 causes the processor 204 to successfully detect 3D wheels in a set of images, the stabilization module 254 can cause the processor 204 to influence the stabilization results to guarantee that the gravity vector points up and that a virtual line connecting the visible pairs of wheels in the 90-degree and 270-degree views of the vehicle are exactly horizontal with the wheels having equal distance from the center of rotation. Further, the memory 208 may include a zoom/scale module 256 that, when executed may cause the processor 204 to control the zoom/scaling level such that the wheels of any stabilized vehicle will always appear in the exact same position for every vehicle stabilized with the method. Further, the memory 208 may include a translation correction module 258 that, when executed, may cause the processor 204 to make translation or translation/scale adjustments to correct errors.

In some embodiments, the stabilization module 254 may cause the processor 204 to use the empty image area module 236 to determine how much each frame would need to scale to completely hide the empty areas of the frame, and then compute a smoothly varying set of zoom values that hide the empty areas of every frame. As a result, the stabilization module 254 causes the processor 204 to achieve a desired stabilization that smoothly zooms in when necessary and that guarantees that empty image areas remain hidden.

In some embodiments, if too much zoom is being used to hide empty image areas, the stabilization module 254 may cause the processor 204 to execute the empty image area module 236 to perform a translation-based correction method to be used in conjunction with the scaling based solution above. Here, for each frame, the empty image area module 236 may cause the processor 204 to compute the translation required to hide all exposed areas of the image for a given amount of zoom. The empty area module 236 then computes a smoothly varying set of translation values that hide the empty areas of every frame. The stabilization module 254 may link the stabilized images to form a 360 degree 3D composite image.

In some embodiments, the memory 208 may include a graphical interface 259 that, when executed, may cause the processor 204 to provide an interface (such as an application window) through which a user may view and interact with a 360 degree 3D composite image. A user may interact with the interface through the input interface 210 and display interface 212 (or touchscreen interface) to manually specify important features of a car in 3D, which can be called "3D Tags". The selected portions of an image can be labeled by a user, and the feature may be tracked through multiple images (using the tag traveling module 242) such that a labeled area in one image will appropriately move with the vehicle in neighboring images of the set of images. For example, the user may tap on the left side-view mirror in a single image of a vehicle, which may cause the graphical interface module 259 to display a popup window within the interface in order to receive user input. The user may then interact with the input interface 210 to add the text "Mirror" within the popup window, and the graphical interface module 259 may subsequently display the text as an overlay on the composite image.

In some embodiments, the elements within the image may be tagged using one of two methods. In a single-tap method, the tagging input interface 238 and the tag traveling module 242 may rely on the existence of 3D automobile geometry produced by the 3D geometric module 244. In an example, the 3D geometric module 244 may cause the processor 204 to generate a list of connected 3D triangles (known as a polygon mesh) that describe the 3D shape of the subject 106. Using the single-tap method, a user may tap on a single point in a single image. The tag traveling module 242 may cause the processor 204 to intersect a 3D ray (originating from the 3D camera center for the image in which the element was selected and extending through the point on the focal plane corresponding to the 2D position where the user tapped the image). Using each of the triangles composing the 3D automobile geometry, the tag traveling module 242 may cause the processor 204 to find the closest 3D point of intersection and to add the text tag to that point. The text or label may be stored in memory 208 and correlated to that point. If there is no intersection with the 3D geometry, the tag traveling module 242 may cause the processor 204 to find the point on the geometry which comes closest to the 3D ray and choose that point instead.

In the two-tap method, the user may tap the same feature or element of the subject 106 in two different images (separated by some predetermined degrees of rotation, such as five degrees). The tag traveling module 242 may cause the processor 204 to triangulate the 3D Tag point by intersecting the rays originating from the camera center of each image and traveling through the corresponding points of the focal plane of each image.

In certain embodiments, the 3D geometric module 244 may cause the processor 204 to determine or generate 3D geometry of an object. In an example, the 3D geometry may be determined using only information determined from the recovered 3D camera locations and the computed center of mass of the automobile. Using the information, the 3D geometric module 244 may cause the processor to generate a rough rectangular prism, consisting of twelve triangles connecting eight vertices describing a box-shaped 3D volume in which we believe the subject 106 exists. In this example, the subject 106 may be a vehicle, such as a car. Assuming the user walked in a roughly circular path around the car and assuming that the circular path has a diameter of approximately eleven meters, which provides an (estimated) absolute scale for the whole scene, the 3D geometric module 244 may cause the processor 204 to put four of the vertices on the ground, assuming an average human height of 1.65 meters, by subtracting 1.65 meters from the average camera height in the 3D scene. The 3D geometric module 244 may then cause the processor 204 to center a rectangular prism around the center of mass of the car with the following dimensions based on average vehicle sizes: length of 4.5 meters, width of 1.9 meters, and height of 1.6 meters. Further, the 3D geometric module 244 may assume that the first image of the sequence of images was captured directly in front of the car, which determines the direction of orientation of the 3D box.

In some embodiments, where the wheels module 252 has caused the processor 204 to successfully detect four 3D wheels in the scene, the rectangular prism creation method can be adapted to exactly fit the detected 3D wheels instead of relying on average car length and width values, directly. The 3D geometric module 244 may cause the processor to set the width of the rectangular prism exactly equal to the distance between the centers of the left and right wheels of the car (averaged over front and back pairs of wheels). The 3D geometric module 244 may cause the processor to set the length of the rectangular prism to be 1.6 times the distance between the centers of the front and rear wheels (averaged over left and right pairs of wheels). The height estimate still may be based on average car sizes.

In some embodiments, the 3D geometric module 244 may cause the processor 204 to further refine the car shape within the rectangular volume. In an example, the 3D geometric module 244 may cause the processor 204 to use the existing 360 imagery and camera poses to compute a dense 3D point cloud of the scene. The 3D geometric module 244 may cause the processor 204 to warp the vertices of an oblate spheroid, centered at the automobile's center of mass, to best fit the points in the dense point cloud.

Alternatively, the 3D geometric module 244 may cause the processor 204 to use a space carving approach to generate the car geometry in which the rectangular prism can be carved into a 3D grid of voxels. For every image in the scene, the 3D geometric module 244 may cause the processor 204 to automatically segment the car from the background. Then, the 3D geometric module 244 may cause the processor 204 to project each background pixel onto the voxel grid and eliminate any voxels which are touched by projected background pixels. After carving away the background pixels from each point of view, what remains is a set of voxels which describes the 3D geometry of the car. In some embodiments, the 3D geometric module 244 may cause the processor 204 to use the Marching Cubes algorithm to convert these voxels into a 3D mesh, a set of triangles compatible with the above-outlined 3D tagging procedure.

In some embodiments, the computing device 202 may be used to capture or to receive a plurality of images of a subject 106 and to process the plurality of images to produce a closed loop around the subject 106. The computing device 202 may identify feature points in each image and transform, scale, or otherwise align the images along feature tracks that traverse multiple images of the set of images. The computing device 202 may further process the image data to determine a gravity vector and a center of mass and may adjust (transform, translate, scale, or otherwise adjust images) to provide a smooth, 360 degree, 3D composite image formed from a plurality of images aligned to the gravity vector extending through the center of mass. The computing device 202 may present the 360 degree, 3D composite image in a graphical interface, and the user may view and interact with the 360 degree, 3D composite image via the input interface 210 and the display interface 212 (or touchscreen interface).

Figure 3:
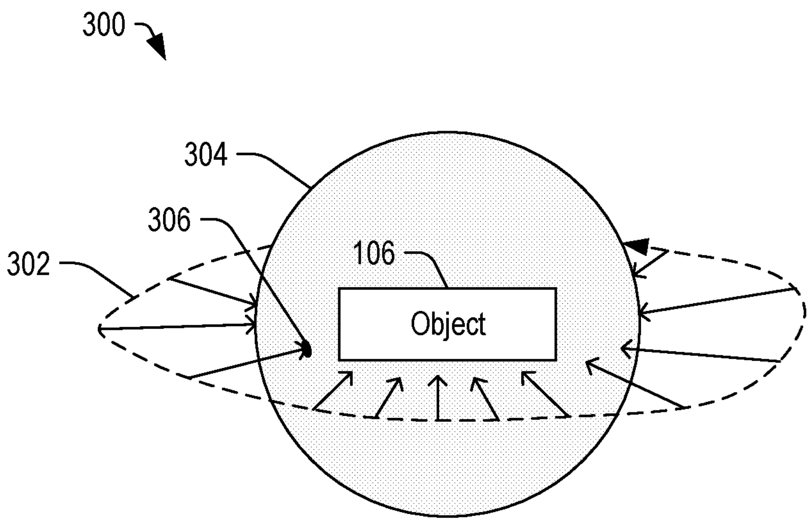
FIG. 3 illustrates a conceptual diagram of the camera angle relative to a surface of a sphere surrounding the object, in accordance with certain embodiments of the present disclosure.

FIG. 3 illustrates a conceptual diagram 300 of the camera angle relative to a surface of a sphere 304 surrounding the subject or object 106, in accordance with certain embodiments of the present disclosure. As the user traverses a substantially circular path 302 about the object 106, the user may capture images of the object 106 using a camera device or a computing device 202. The camera or computing device 202 may capture images periodically or after determining that a selected distance along the path 302 has been traversed. In some embodiments, the computing device 202 may determine the intersection of the camera angle with the virtual sphere. The angle may be used, in part, to triangulate a distance between the object 106 and the camera.

As described above, the feature point management module 220 may be configured to identify and track distinctive "feature points" between captured image frames and to adjust at least some of the images to align feature points from image to image or from one image to a set of images. Embodiments of feature point selection are shown in regard to FIGS. 4A and 4B.

Figure 4A:
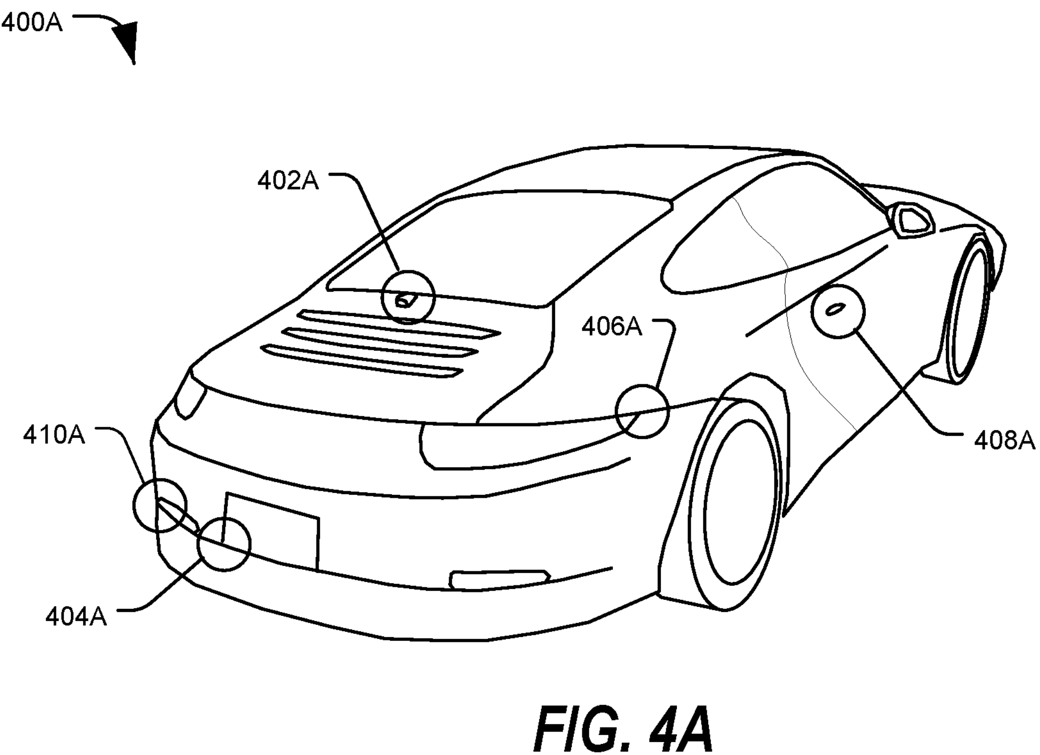
FIGS. 4A and 4B depict a vehicle, which may be the object being photographed, including selected feature points that may be used to perform composite image capture and processing, in accordance with certain embodiments of the present disclosure.
Figure 4B:
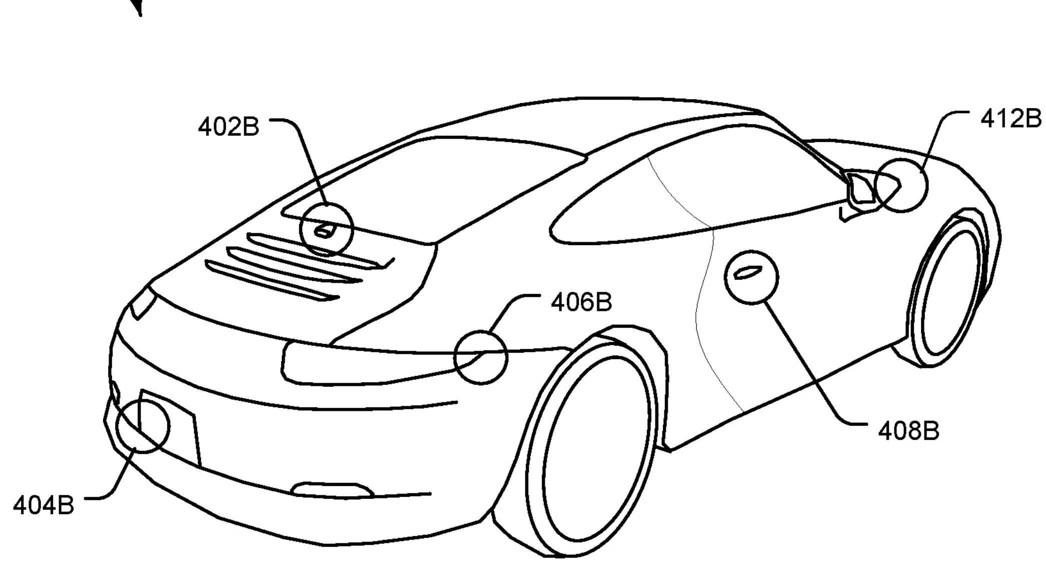

FIGS. 4A and 4B depict a vehicle, which may be the object being photographed, including selected feature points that may be used to perform composite image capture and processing, in accordance with certain embodiments of the present disclosure. FIG. 4A depicts a first illustration 400A of a subject car, which illustration 400A may represent a first frame of a set of images captured as part of a composite image capture method. FIG. 4B depicts a second illustration 400B of the subject car, which illustration 400B may represent a second frame captured after the camera had been moved in a counter-clockwise direction from the position in which the first frame 400A was captured.

In some embodiments, the RANSAC module 220 and the feature point tracker 222 in FIG. 2 may be configured to identify one or more feature points in each captured frame. The feature points may be selected based on colors, contrast, patterns, shapes, brightness, or other distinguishing features relative to the surrounding pixels or image area. In an example embodiment, the RANSAC module 220 and the feature point tracker 222 may identify feature points 402A, 404A, 406A, 408A, and 410A from frame 400A. The RANSAC module 220 and the feature point tracker 222 may cause the processor 204 to store positional data, pixel color or brightness attributes, or other data corresponding to each point identified in frame 400A.

The RANSAC module 220 and the feature point tracker 222 may also cause the processor 204 to identify feature points in frame 400B, such as feature points 402B, 404B, 406B, 408B, and 412B, and to compare attributes of the feature points identified in each frame to determine matching or corresponding feature points between frames. Corresponding feature points may indicate a feature of the subject or object 106 that can be tracked between frames to determine a smoothness of movement or transition between frames.

In some embodiments, feature points in each frame can be identified that do not appear in consecutive frames. For example, feature point 410A from frame 400A may correspond to feature that has moved out of view in frame 400B because the position and orientation of the camera device or computing device 202 is changed, and therefore the feature point 410A cannot be tracked between frames. In some embodiments, the feature point may not be identifiable in a subsequent frame due to other factors, such as change in lighting, reflection, coloration, obstruction, or other factors. In some embodiments, the RANSAC module 220 and the feature point tracker 222 may cause the processor 204 to select or discard a feature point that cannot be identified in a subsequent frame, a set number of consecutive frames (e.g., three, ten, or some other number of consecutive frames), some percentage of consecutive frames (e.g., identified in seven frames out of ten consecutive frames), based on another metric, or some combination thereof.

Although feature point 412B of frame 400B was not identified in frame 400A, the camera may determine the feature point 412B is distinctive. In some embodiments, the feature point 412B may be determined in a subsequent image or frame. In some embodiments, the feature point 412B may not be distinctive or may not be determined in subsequent frames, in which case the feature point 412B may be discarded.

In some embodiments, the RANSAC module 220 and the feature point tracker 222 may attempt to match feature elements that are independently identified in each frame based on a feature selection algorithm. In some embodiments, the RANSAC module 220 and the feature point tracker 222 may attempt to "locate" a feature point identified in a previous frame by searching the image for similar characteristics (e.g. color, relative location, etc.). Once a set of feature points is identified in a set of frames, the RANSAC module 220 and the feature point tracker 222 may cause the processor 204 to use the identified feature points to perform image adjustments (rotation, skew, warp, horizontal or vertical shift, or other adjustments), alignment (horizontal or vertical adjustments), and composite image smoothing. An example embodiment of a method of image alignment and composite image smoothing is described below with respect to FIG. 5.

Figure 5:
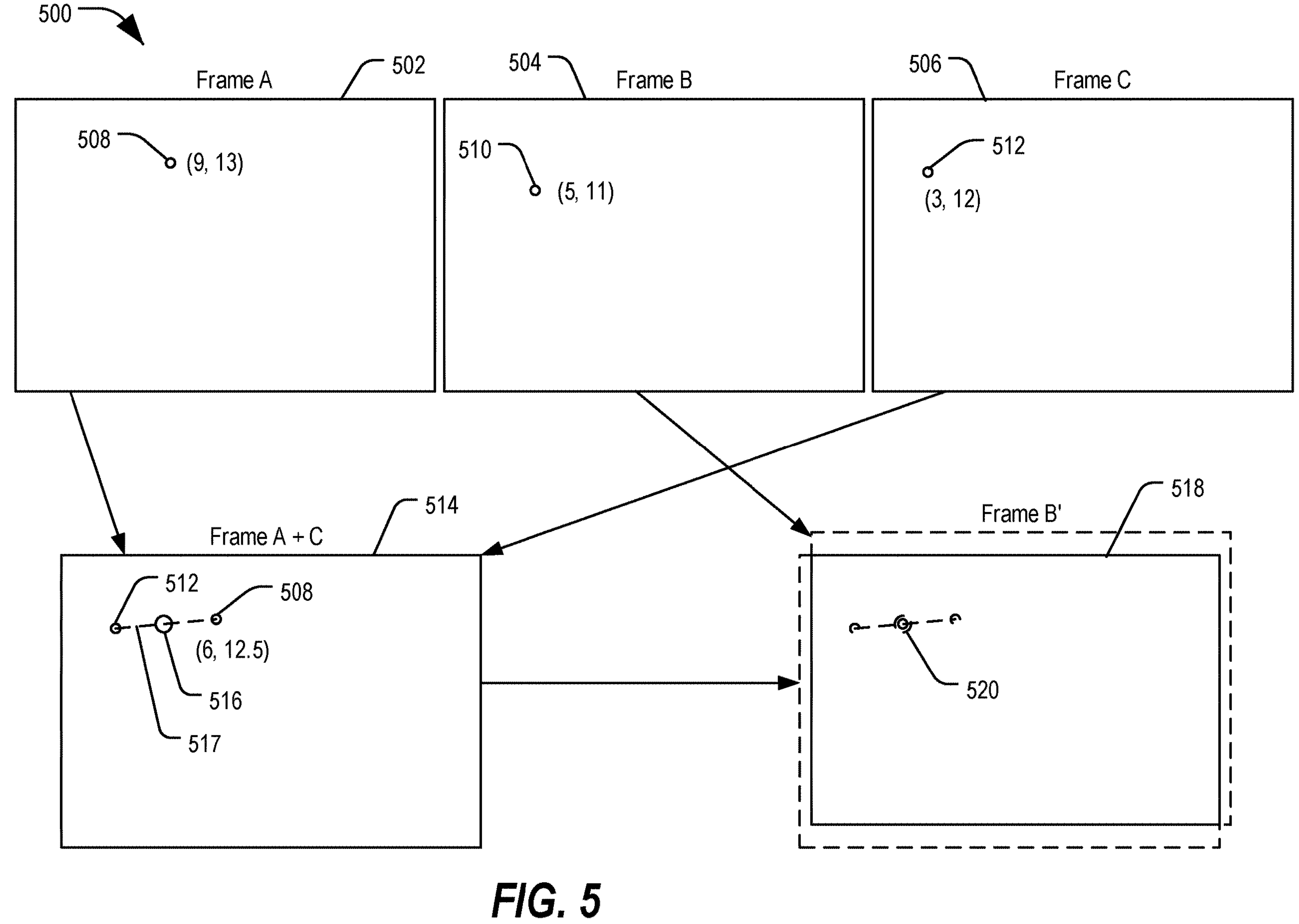
FIG. 5 depicts a block diagram of a sequence of frames having selected feature points that may be used to adjust frames to provide composite image capture, in accordance with certain embodiments of the present disclosure.

FIG. 5 is a block diagram 500 of a sequence of frames including selected feature points that may be used to adjust frames to provide composite image capture, in accordance with certain embodiments of the present disclosure. The diagram 500 includes a set of three consecutive image frames: Frame A 502, frame B 504, and frame C 506. Each of the depicted frames includes a corresponding feature point: feature point 508, 510, and 512, respectively. The feature point 508, 510, and 512 in each frame may correspond to the same point or feature on a subject. Between the times when the three depicted frames were captured, the x-y coordinates of the feature points changed because the position and/or orientation of the camera device changed. With respect to a pixel location, the feature point 508 may be located at an x-y pixel position (9, 13); the feature point 510 may be located at an x-y pixel position (5, 11); and the feature point 512 may be located at an x-y pixel position (3, 12).

In the following discussion, an alternative approach that can be used to generate the smooth, 360 degree composite image is discussed. This approach may be used in case of failure of the 3D approach described above. In this alternative 2D, midpoint-based approach, the RANSAC module 220 and the feature point tracker 222 of FIG. 2 may iteratively process the frames, selecting non-consecutive frames. In the depicted embodiment, frame A 502 and frame C 506 may be selected, and a midpoint may be calculated that is between the feature point 508 in frame A 502 and the feature point 512 in frame C 506. The comparison of frame A 502 and frame C 506, as well as the calculated midpoint are shown in frame A+C 514. In some embodiments, the midpoint between two x-y coordinates may be calculated as follows:

$$([x1+x2)/2], [(y1+y2)/2]) \quad (1)$$

where the coordinate (x1, y1) represents the x-y coordinate of a first pixel position of the selected feature point 508, and the coordinate (x2, y2) represents the x-y coordinate of a second pixel position of the selected feature point 512. In the instant case, the midpoint between feature point 508 and feature point 512 may be calculated as ([(9+3)/2], [(13+12)/2])=(6, 12.5), represented as the midpoint position 516 in frame A+C 514.

Once the midpoint between selected feature points in non-consecutive frames is determined, one or more affine transformations may be calculated or determined to apply to one or more intervening frames between the non-consecutive frames to align the selected feature point to the track, to the midpoint, or both. In certain embodiments, a set of linear equations may be used to identify a least-squares solution for the affine transform, which maps the points in one or more intermediate frames to the midpoints while minimizing the squared error between them (between the transformed points and the midpoints). The affine transformation may include a plurality of parameters. In certain embodiments, each pair of corresponding points (one from the middle frame points and its corresponding midpoint) provides two equations, one for the x-coordinates and one for y-coordinate. If there are thirty pairs of corresponding feature points, there may be sixty linear equations with six unknowns, which can provide an overdetermined system of linear equations.

In certain embodiments, a random sample consensus approach may be used. The approach may include choosing a number of random subsets of three correspondences at a time. This approach can be used to find an exact solution for the affine transformation that maps the points perfectly (six equations and six unknowns). The system may then determine an error induced by using the same affine transform for all of the other 27 pairs of points. The system can perform this calculation iteratively (hundreds of times), and can settle on the transform that has the most "inliers" (i.e., the most points that have small errors under the transform).

In certain embodiments, when determining the affine transformations, the relational analysis may be performed that best brings each of the points in one frame into alignment with each of the transformed points in the other frames. If the distance between pairs of points changes, the distance between the midpoints will have changed by half as much. Assuming each frame is numbered sequentially based on the order in which it was taken, the intervening frames may be frames sequentially located after a first frame in the non-consecutive set of frames, and prior to a second frame in the non-consecutive set of frames (e.g., between frame A 502 and frame C 506). The affine transformations may be selected based on which transformations will bring the corresponding feature points of the intervening frames in line with the calculated midpoint 516. In the example embodiment, frame B 504 is translated (e.g. moved) to bring feature point 510 in line with the calculated midpoint 516. The transformed frame B is depicted in FIG. 5 as frame B' 518. In frame B' 518, the feature point 510 has been moved to midpoint 516, now depicted as point 520.

Different image frames may include visual matter not shown in adjacent frames, due to lighting, waver or movement of the camera device or computing device 202, orientation changes, or other factors. Accordingly, when a frame is translated or otherwise transformed, portions of the frame or nearby frames (e.g. at the periphery of the images) may be cropped or removed to maintain consistent views between consecutive frames.

With the feature point 510 of frame B 504 moved into line with the midpoint between the feature points of frames A 502 and C 506 to create frame B' 518, the alignment of the frame sequence may be improved. When viewed in sequence, frames A 502, B' 518, and C 506 may be presented in a fast sequence to provide a smooth composite image, with the feature represented by feature points 508, 510, and 512 moving in a smooth line or "track", which track may be continuous, allowing the user to rotate the composite image 360 degrees without visual discontinuities.

In the example of FIG. 5, a simplified embodiment is described in which a single feature point is tracked between frames. However, in some embodiments, multiple feature points may be tracked, and other or additional affine transformations (e.g. rotation, scaling, skew, etc.) may produce superior results. For example, rather than moving a single point to a calculated midpoint, the camera may attempt to perform affine transformations that will adjust image alignment based on thirty feature points being moved as close as possible to thirty calculated midpoints. In some embodiments, rather than performing such transformations on images between two non-adjacent frames or sets of frames, a smooth track may be calculated for each of the plurality of feature points and may be adjusted from frame to frame and across all of the frames including the start and end frames to provide the smooth composite image.

In some embodiments, after performing transformations on frame B 504 to create frame B' 518, the camera may iterate to a next set of frames. For example, the camera may next select frame B' 518, frame C 506, and frame D (not shown) and repeat the process. Midpoints may be calculated between feature points of frame B' 518 and feature points of frame D, and frame C 506 may be transformed to bring corresponding feature points as close as possible to the calculated midpoints. Other embodiments are also possible.

In some embodiments, the RANSAC module 220 and the feature point tracker 222 may use different ranges of non-consecutive frames. For example, rather than using three consecutive frames, the RANSAC module 220 and the feature point tracker 222 may calculate midpoints of feature points between frame 1 and frame 9, and use the calculated mid-points to transform frame 5 in the middle. In some embodiments, the RANSAC module 220 and the feature point tracker 222 may calculate averages of midpoints based on feature points from every frame in a set. For example, the RANSAC module 220 and the feature point tracker 222 may use feature point coordinates of frames 1-4 and 6-9 to calculate a midpoint to adjust the positioning of frame 5. In some embodiments, the RANSAC module 220 and the feature point tracker 222 may use feature point coordinates of frames 1 through 9, including frame 5, to calculate midpoints to apply in transforming frame 5. Other embodiments are also possible.

The frame comparison and midpoint calculation may similarly be performed between the last set of frames at the end of the image recording path, and the first set of frames from the beginning of the image recording path, in order to align the images and create a smooth composite image that seamlessly joins the beginning and ending frames. For example, if a set of recorded frames includes frame 1 through frame N, the RANSAC module 220 and the feature point tracker 222 may perform a comparison wherein feature point midpoints are calculated between frame N−1 and frame 1 to apply in transforming frame N, and between frame N and frame 2 to apply in transforming frame 1, etc. The start and endpoint misalignment may be greater than the misalignments between selected feature points of adjacent frames. Accordingly, an end point transformation may cause an iterative re-alignment or adjustment of the intervening frames, producing the smooth composite image through a plurality of iterations.

In some embodiments, the RANSAC module 220 and the feature point tracker 222 may iterate through all frames one or more times to perform repeated image alignment and composite image smoothing operations. In certain embodiments, each iteration may improve image alignment and smoothing. In some embodiments, the RAN-SAC module 220 and the feature point tracker 222 may iteratively process all images a selected number of times, which number may be preset or selected by a user. In some embodiments, the RANSAC module 220 and the feature point tracker 222 may continue iterating until all feature points (or some threshold percentage of feature points) are with a threshold distance of the corresponding calculated midpoints.

In some embodiments, each iteration through the frames may employ the same smoothing algorithm. For example, the RANSAC module 220 and the feature point tracker 222 may select a set of a pre-determined number of image frames each time, such as three image frames, nine image frames, or some other number of image frames, and may employ the same smoothing algorithm to each image in the set or for each iteration. In other embodiments, the RANSAC module 220 and the feature point tracker 222 may employ different algorithms for each image in the set or for each iteration. For example, on the first iteration, the RANSAC module 220 and the feature point tracker 222 may use sets of frames (such as three frames), then sets of a different number of frames (such as five frames) for the second iteration, and so on. The number of frames may increase, decrease, or stay the same from iteration to iteration. Further, the adjustment performed on the frames may vary from iteration to iteration. Other embodiments are also possible.

In some embodiments, instead of calculating a midpoint between selected feature points, the RANSAC module 220 and the feature point tracker 222 may calculate a vector 517 connecting selected feature points. As used herein, "vector" may refer to a straight line between two points, and the feature point management module 220 may align intervening frames to the vector 517 to provide a visually smooth transition from frame to frame along a motion vector determined from the selected feature points (visually distinct features within the selected images). For example, rather than aligning intervening frames to the midpoint 516 of the vector 517, the RANSAC module 220 and the feature point tracker 222 may align the feature point of an intervening frame to a point along the calculated vector 517 nearest to the feature point. Over a sequence of iterations, a moving window of selected frames (e.g., frames 1-10 in a first window, frames 2-11 in a second window, and so on) may be used to determine different vectors, and the translations or adjustments to the vector may be applied iteratively to align the sequence of images. Other embodiments are also possible.

In some embodiments, the RANSAC module 220 and the feature point tracker 222 may utilize first alignment algorithm for a first iteration through the sequence of images and may use a second alignment algorithm for a second iteration (and optionally another alignment algorithm or one of the first and second algorithm for subsequent iterations). In certain embodiments, the RANSAC module 220 and the feature point tracker 222 may use a course alignment algorithm for a first iteration, a less course or fine alignment algorithm for a subsequent iteration. In some embodiments, the RANSAC module 220 and the feature point tracker 222 may process the images in the sequence, iteratively, with increasingly fine alignments. In a particular example of a course alignment algorithm, the RANSAC module 220 and the feature point tracker 222 may select boundary frames (e.g., a first frame (N) and a second frame (N+T)) and may align the corresponding feature point of an intermediate frame (N+T/2) to the track connecting the feature points in the boundary frames. In subsequent iterations, the spacing between the boundary frames may be reduced incrementally to decrease the size of the window. In an example, the first iteration may involve a midpoint of images that are 16 frames apart, while the second iteration may involve a midpoint of images that are 8 frames apart, then 4 frames apart, then 2 frames apart, etc. In this example, subsequent iterations may produce a finer alignment as compared to the course alignment of the first iteration. Other embodiments are also possible.

As discussed above, the RANSAC module 220 and the feature point tracker 222 may perform additional modifications to image frames beyond affine transformations, such as resizing, downsizing, or otherwise adjusting image frames. In some embodiments, visual elements about a periphery of the images may be blurred to reduce visual artifacts.

In some embodiments, the 3D geometric module 244 may cause the processor to determine the object within each of the plurality of images and to blur the background in each image to enhance the central focus of the object. In some embodiments, the 3D geometric module 244 may cause the processor to remove the background in each image, blurring everything in each image that is not part of the object, simulating a shallow depth-of-field/bokeh effect. In a particular example, the 3D geometric module 244 may cause the processor to determine boundaries or edges of the object to determine the object's extent and to identify aspects of the image that are outside of the object's extent as the background.

Figure 6A:
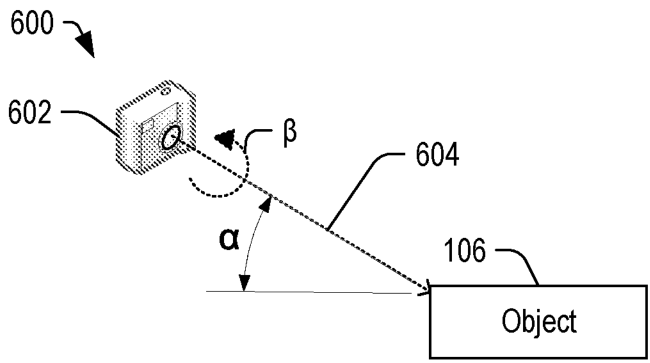
FIG. 6A depicts a diagram of a distance between a camera and the object determined from data from the camera, in accordance with certain embodiments of the present disclosure.

FIG. 6A depicts a diagram 600 of a distance between a camera 602 and the object 106 determined from data from the camera image, in accordance with certain embodiments of the present disclosure. In an example, assuming a virtual sphere (e.g., sphere 304 in FIG. 3), the distance 604 from the camera 602 to a 3D point of the object 106 can be determined based, in part, on the camera's focal length. Further, the rotation (13) of the camera 602 may also be determined. It should be appreciated that, though a camera 602 is shown, the camera 602 may be a computing device 202 with optical sensors 206. The particular image corresponding to this camera 602 may capture an image at an angle (a) relative to the sphere.

Figure 6B:
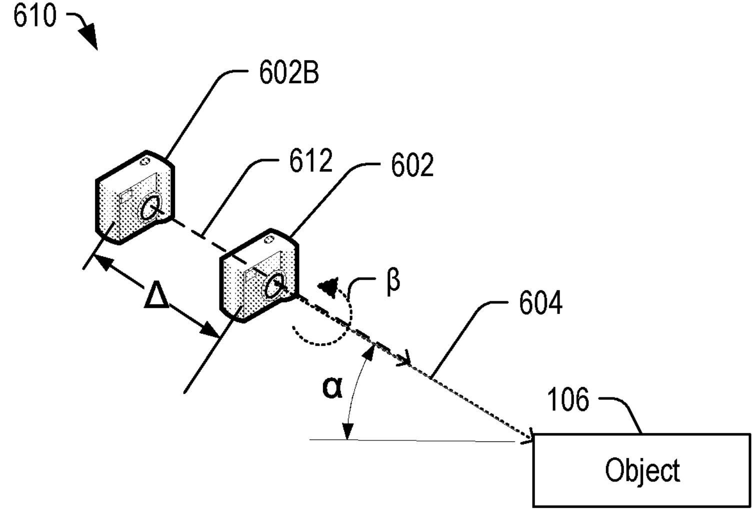
FIG. 6B depicts a diagram indicating a discrepancy between the distance determined from data from the camera and a distance determined using triangulation based on 3D points within the image of the object, in accordance with certain embodiments of the present disclosure.

FIG. 6B depicts a diagram 610 indicating a discrepancy (A) between the distance 604 determined from data from the camera and a distance 612 determined using triangulation based on 3D points within the image of the object, in accordance with certain embodiments of the present disclosure. If the discrepancy (A) is greater than a threshold, the particular 3D point or the image may be discarded.

Figure 7:
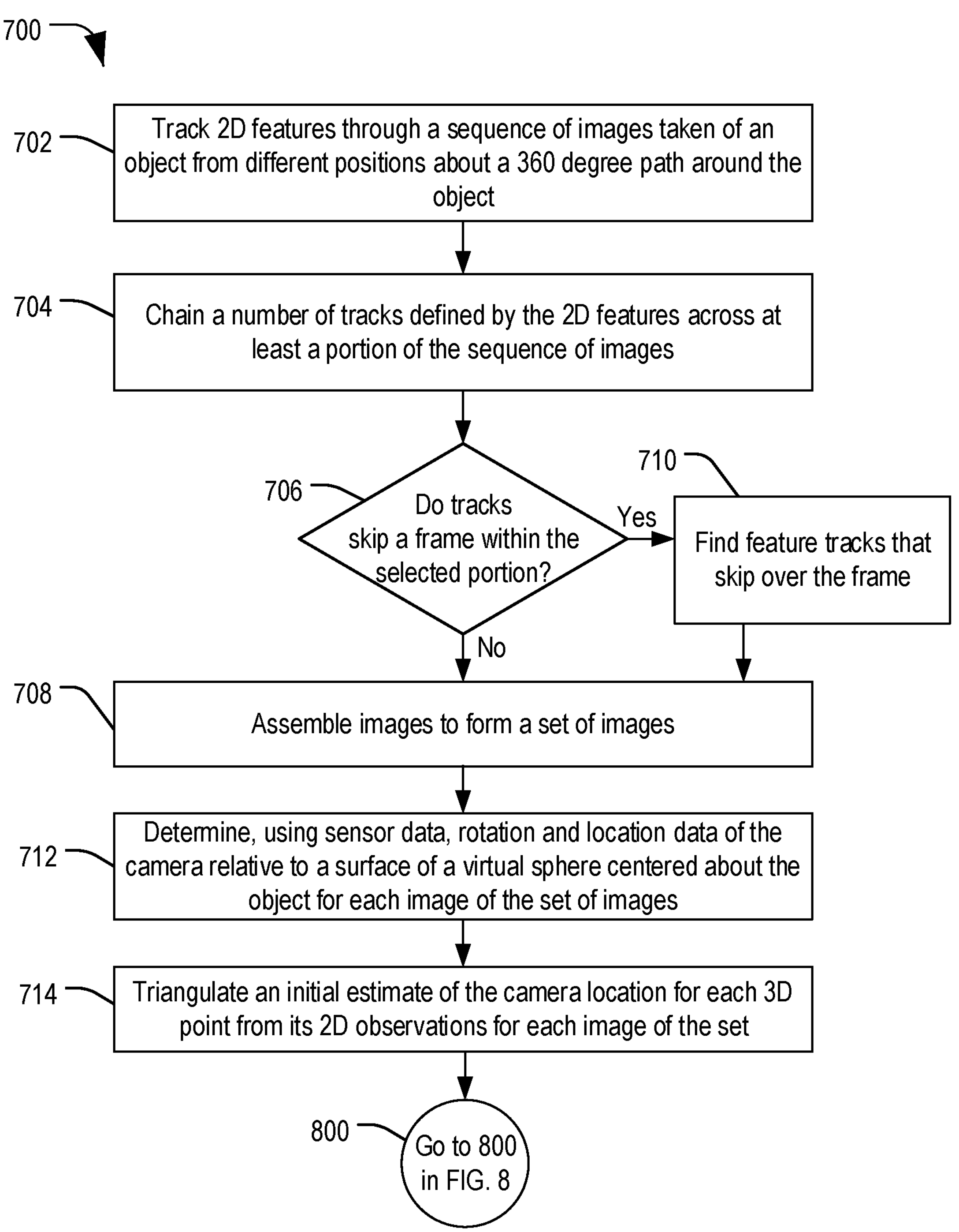
FIG. 7 depicts a flow diagram of a method of determining a position of the camera and estimating the camera position based on triangulation, in accordance with certain embodiments of the present disclosure.

FIG. 7 depicts a flow diagram of a method 700 of determining a position of the camera and estimating the camera position based on triangulation, in accordance with certain embodiments of the present disclosure. In some embodiments, the method 700 can include performing histogram equalization on each image of the set of images to reduce sun glare. In an example, reflection, sparkle, and other light-based distortion due to sun glare may be removed or reduced. After such equalization, at 702, the method 700 can include tracking 2D features through a sequence of images taken of an object from different positions about a 360 degree path around the object. At 704, the method 700 can include chaining a number of tracks defined by the 2D features across at least a portion of the sequence of images. In a particular example, the computing device may determine a vector or track connecting a 2D feature across multiple images of the sequence. Several 2D features may define tracks that traverse multiple images, and the tracks may be chained together to define a feature set.

At 706, the method 700 determines whether a track skips a frame within a selected portion of the set of images. If so, at 710, the method 700 may include finding feature tracks that skip over the frame. In some embodiments, the method 700 may include tracking between non-consecutive frames that are the neighboring frames of the "skipped" frame. In some embodiments, such frames may be locked to their initially estimated position and orientation. Then, at 708, the method 700 can include assembling the images to form a set of images. At 706, if the track does not skip a frame, the method 700 advances to 708 and the images are assembled to form the set of images.

At 712, the method 700 can include determining, using sensor data, rotation data and location data of the camera relative to a surface of a virtual sphere centered about the object for each image of the set of images.

At 714, the method 700 can include triangulating an initial estimate of the camera location for each 3D point from its 2D observations for each image of the set. The method 700 may then advance to 800 in FIG. 8.

Figure 8:
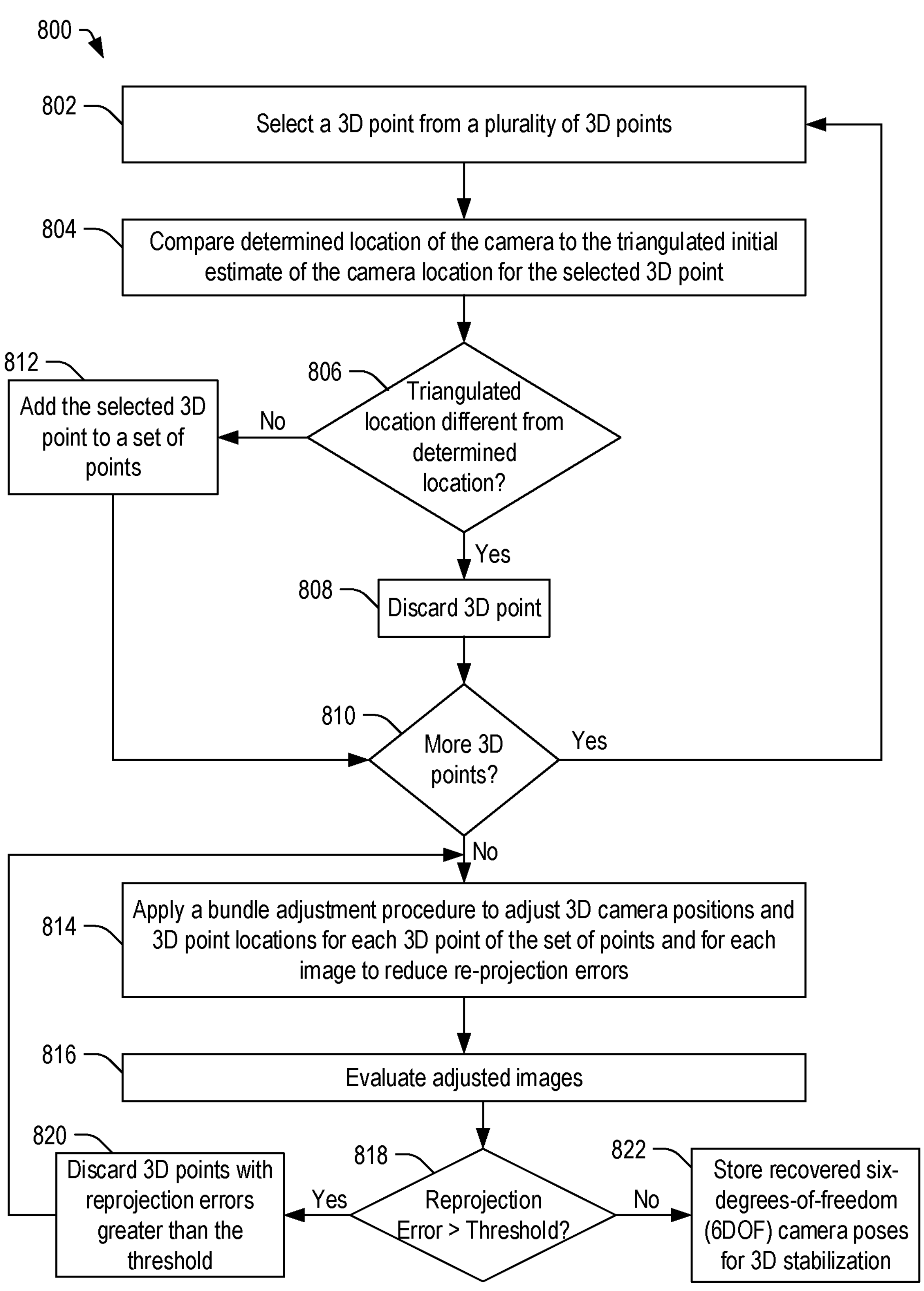
FIG. 8 is a continuation of the flow diagram of FIG. 7 and including a method of determining six-degrees-of-freedom camera poses based on a plurality of 3D points determined from the images, in accordance with certain embodiments of the present disclosure.

FIG. 8 is a continuation of the flow diagram of FIG. 7 and including a method 800 of determining six-degrees-of-freedom camera poses based on a plurality of 3D points determined from the images, in accordance with certain embodiments of the present disclosure. At 802, the method 800 may include selecting a 3D point from a plurality of 3D points. At 804, the method 800 can include comparing a determined location of the camera to the triangulated initial estimate of the camera location for the selected 3D point.

At 806, the method 800 may include determining if the triangulated location is different from the determined location. In some embodiments, the difference must be greater than a threshold difference to identify the locations as being different. If the locations are different, the method 800 may include discarding the selected 3D point, at 808. At 810, the method 800 can determine if there are more 3D points. If so, the method 800 returns to 802 to select another 3D point from the plurality of 3D points.

Returning to 806, if the locations are the same (or the difference is less than a threshold difference), the method 800 can include adding the selected 3D point to a set of 3D points, at 812. The method 800 may then determine if there are more 3D points, at 810. If so, the method 800 returns to 802 to select another 3D point from the plurality of 3D points. Otherwise, the method 800 may include applying a bundle adjustment procedure to adjust the 3D camera positions and 3D point locations for each 3D point of the set of points and for each image to reduce re-projection errors, at 814. In some embodiments, the re-projection error refers to a difference between an observed 2D feature track in a selected image and where the 2D feature track projects according to the current 3D camera and 3D point estimates for each point in each image in which the 3D point was observed. During bundle adjustment, the system may constrain the rotation of the first and last camera to closely match the rotations reported by the gyro and magnetometer so that the plurality of images can be aligned to form the closed-loop composite image.

At 816, the method 800 can include evaluating the adjusted images. At 818, if the re-projection error is greater than a threshold error, the method 800 may include discarding 3D points with re-projection errors greater than the threshold error, at 820. Referring to 818, if, at the end of bundle adjustment, there remain 3D points with significant re-projection error (i.e., re-projection error greater than a threshold error), these 3D points can be removed and another round of bundle adjustment can be performed. The method 800 may then return to 814 to reapply the bundle adjustment procedure. Otherwise, at 818, if the re-projection error is not greater than the threshold error, the method 800 can include storing the recovered six-degrees-of-freedom (6 DOF) camera poses for 3D stabilization.

Figure 9:
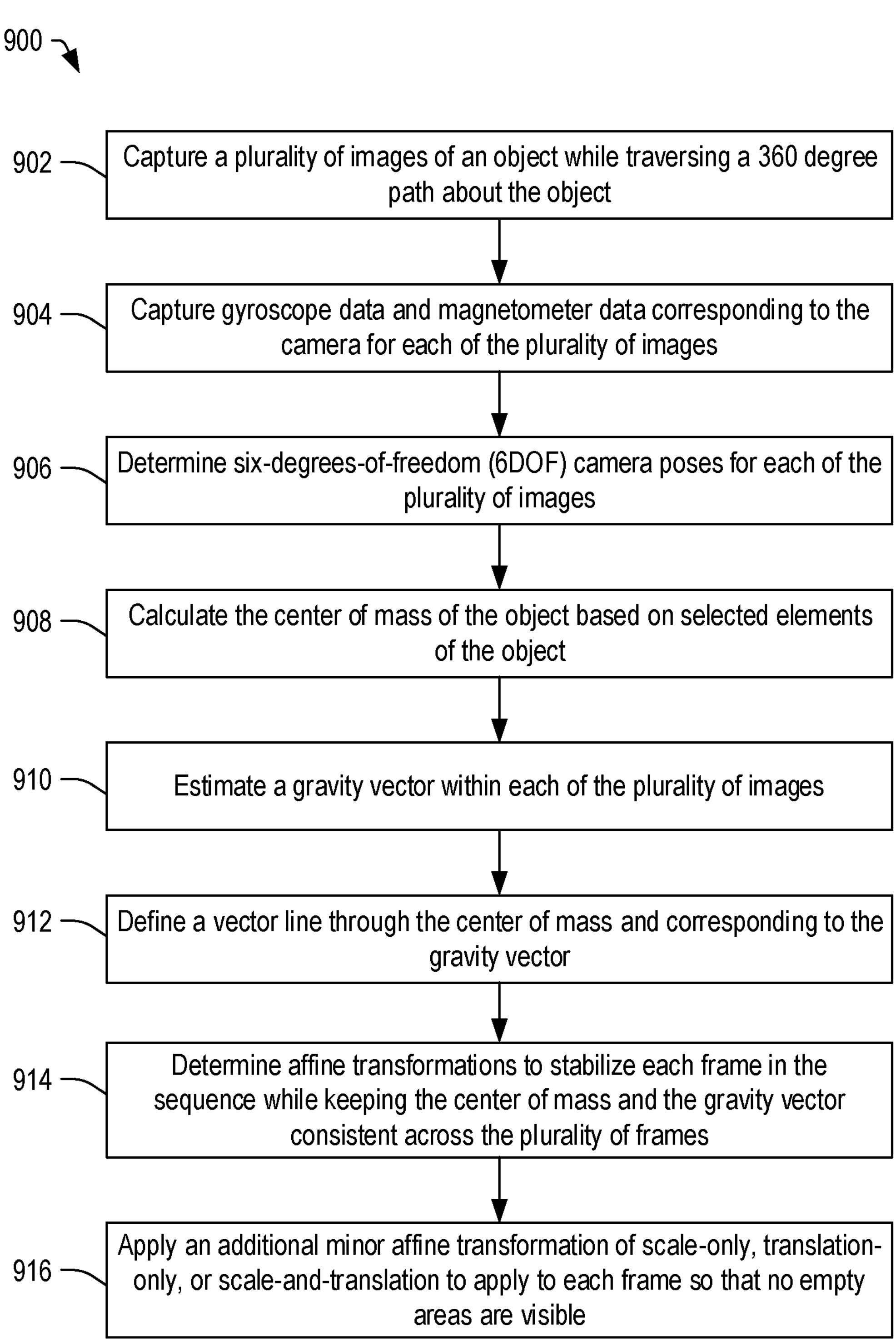
FIG. 9 depicts a flow diagram of a method of adjusting images to hide or remove empty spaces, in accordance with certain embodiments of the present disclosure.

FIG. 9 depicts a flow diagram of a method 900 of adjusting images to hide or remove empty spaces, in accordance with certain embodiments of the present disclosure. At 902, the method 900 can include capturing a plurality of images of an object while traversing a 360 degree path about the object. The path may be a circular, elliptical or other shaped path.

At 904, the method 900 can include capturing gyroscope data and magnetometer data corresponding to the camera for each of the plurality of images. The gyroscope data and magnetometer data may be correlated with the image data.

At 906, the method 900 can include determining six-degrees-of-freedom (6 DOF) camera poses for each of the plurality of images. In an example, the 6 DOF camera poses may be determined using the methods 700 and 800 of FIGS. 7 and 8. At 908, the method 900 may include calculating the center of mass of the object based on selected elements of the object. Such elements may include boundary elements, particular features (such as wheels), other aspects of the images, or any combination thereof.

At 910, the method 900 can include estimating a gravity vector within each of the plurality of images. At 912, the method 900 can include defining a vector line through the center of mass and corresponding to the gravity vector. At 914, the method 900 may include determining affine transformations to stabilize each frame in the sequence while keeping the center of mass and gravity vector consistent across the plurality of frames.

At 916, the method 900 may include applying additional minor affine transformations of scale-only, translation-only, or scale-and-translation to apply to each frame so that no empty areas are visible. It should be understood that these "minor" affine transformations may be made in addition to already performed affine transformations in order to eliminate "empty areas" within the stabilized, 360 degree 3D composite image.

Figure 10:
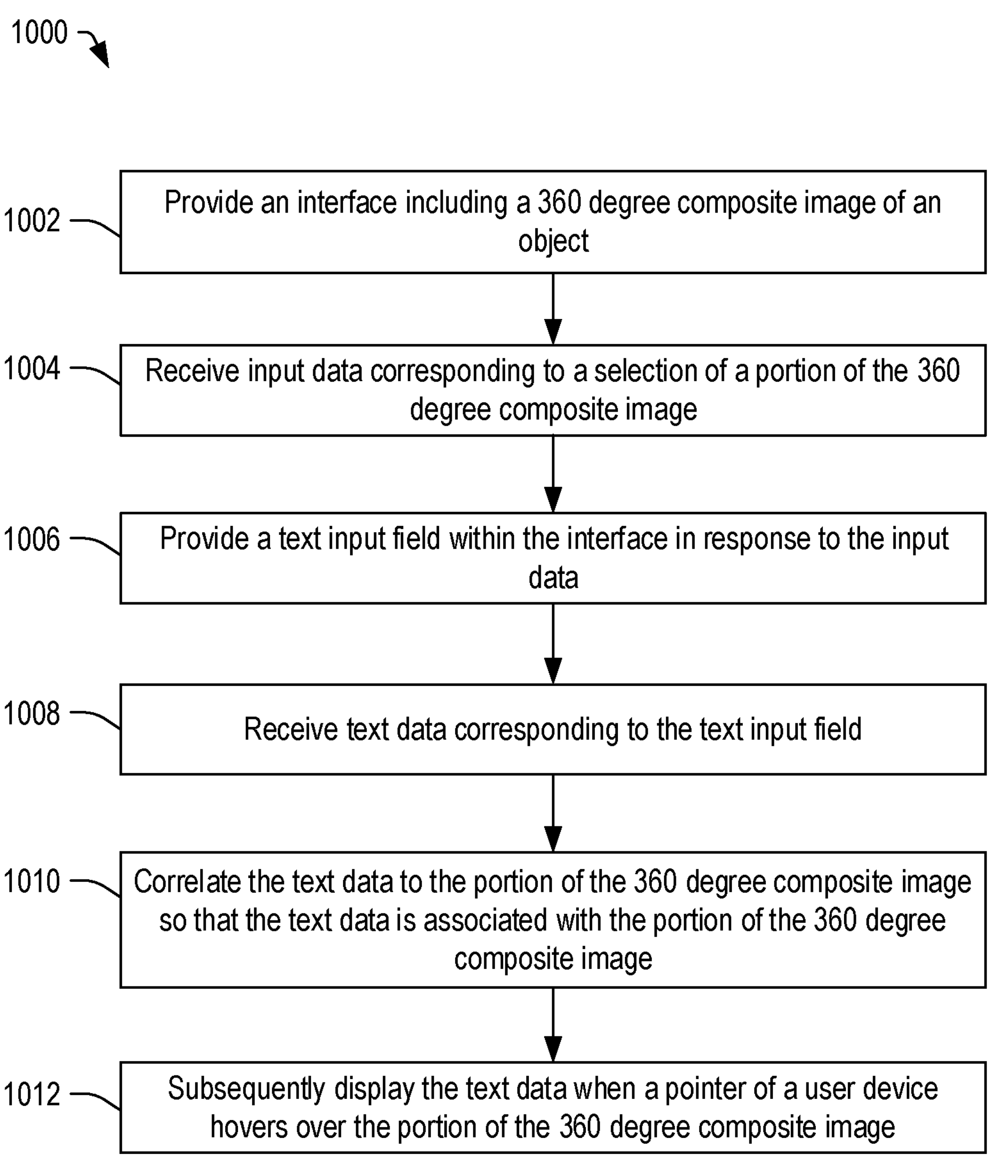
FIG. 10 depicts a flow diagram of a method of tagging a three-dimensional element within a 360-degree surround image, in accordance with certain embodiments of the present disclosure.

FIG. 10 depicts a flow diagram of a method 1000 of tagging a three-dimensional element within a 360-degree composite image, in accordance with certain embodiments of the present disclosure. At 1002, the method 1000 may include providing an interface including a 360 degree composite image of an object. The 360 degree composite image may be a stabilized, 360 degree 3D composite image.

At 1004, the method 1000 may include receiving input data corresponding to a selection of a portion of the 360 degree composite image. In some embodiments, the input data may be received from an input interface including an input device, such as a touchscreen, a mouse, a stylus, a pointer, or another input device. The input data may include a selection of an element of the image, such as a side view mirror of a car in the image. In a particular example, the input data may correspond to a 3D point within the composite image.

At 1006, the method 1000 can include providing a text input field within the interface in response to the input data. The text input field may be presented as a popup window within an interface, for example.

At 1008, the method 1000 can include receiving text data corresponding to the text input field. In an example, the user may enter text using the input interface in order to label or otherwise present information related to the selected element within the image.

At 1010, the method 1000 can include correlating the text data to the portion of the 360 degree composite image so that the text data is associated with the portion of the 360 degree composite image. The data may be stored in a memory together with an indicator or identifier associated with the portion of the image.

At 1012, the method 1000 can include subsequently displaying the text data when a pointer of a user device (such as a mouse, a finger, or another pointer) hovers over the portion of the 360 degree composite image. In some embodiments, the text data may travel with the element within the image when the 360 degree 3D composite image is rotated. It should be appreciated that the displayed 2D position of the 3D point may move realistically within the 360-degree, 3D composite image when the composite image is viewed from different angles.

In general, the method 1000 may be used to enable users to manually specify important features of an object in 3D, which can be called 3D Tags, such that a labeled area in one image will appropriately move with the object in neighboring images of the 360-degree set of images. For example, the system may present a graphical interface including a 3D composite image of a car to a computing device. The user may utilize the input interface of the computing device to interact with the 3D composite image within the graphical interface to tap on the left side-view mirror in a single image, and to the add the text "Mirror" to a text field (e.g., a popup window), which added text may be presented as an overlay on the image. One possible embodiment of a method that will let that text travel with the mirror into all the other images in which the mirror is visible is described below with respect to FIGS. 11 and 12.

Figure 11:
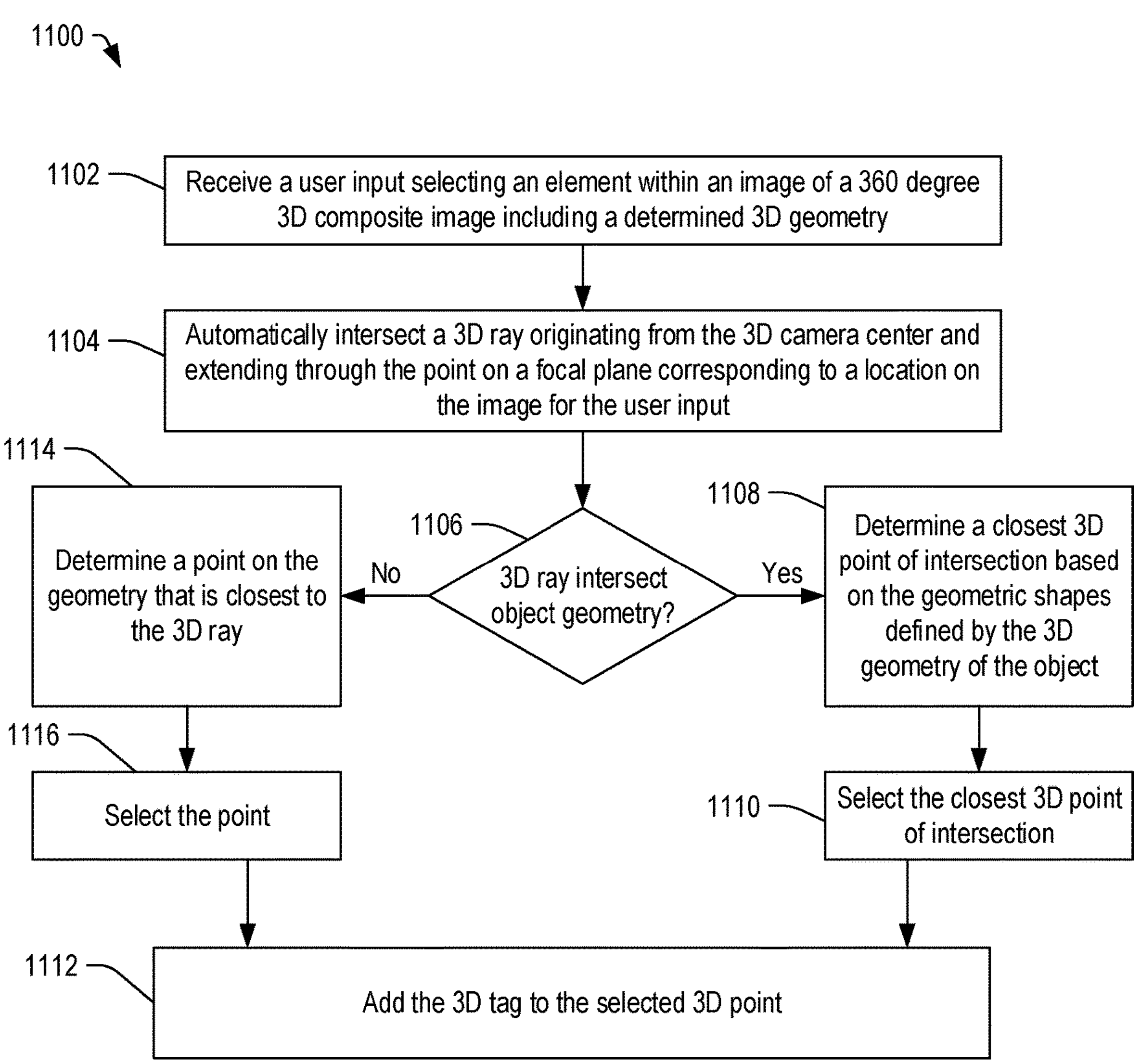
FIG. 11 depicts a method of tagging an element within a 360 degree three-dimensional composite image using a single tap, in accordance with certain embodiments of the present disclosure.

FIG. 11 depicts a method 1100 of tagging an element within a 360 degree 3D composite image using a single tap, in accordance with certain embodiments of the present disclosure. At 1102, the method 1100 can include receiving a user input selecting an element within an image of a 360 degree 3D composite image including a determined 3D geometry. As discussed above, the determined 3D geometry may include a list of connected 3D shapes (such as triangles), which forms a polygon mesh that describe the 3D shape of the object, such as a car.

At 1104, the method 1100 can include automatically intersecting a 3D ray originating from the 3D camera center and extending through the point on a focal plane corresponding to a location on the image for the user input. In an example, the user may touch a feature or element of an object in an image, and the system may determine a 3D ray that would extend from the determined 3D camera position to the selected point.

At 1106, the method 1100 can determine if the 3D ray intersects the object geometry (e.g., the list of connected 3D shapes). If the 3D ray intersects the object geometry, the method 1100 may include determining a closest 3D point of intersection based on the geometric shapes defined by the 3D geometry of the object, at 1108. At 1110, the method 1100 can include selecting the closest 3D point of intersection. At 1112, the method 1100 may include adding the 3D tag to the selected 3D point.

Otherwise at 1106, if the 3D ray does not intersect the object geometry, the method 1100 may include determining a point on the object geometry that is closest to the 3D ray, at 1114. At 1116, the method 1100 may include selecting the point. At 1118, the method 1100 can include adding the 3D tag to the selected 3D point.

Figure 12:
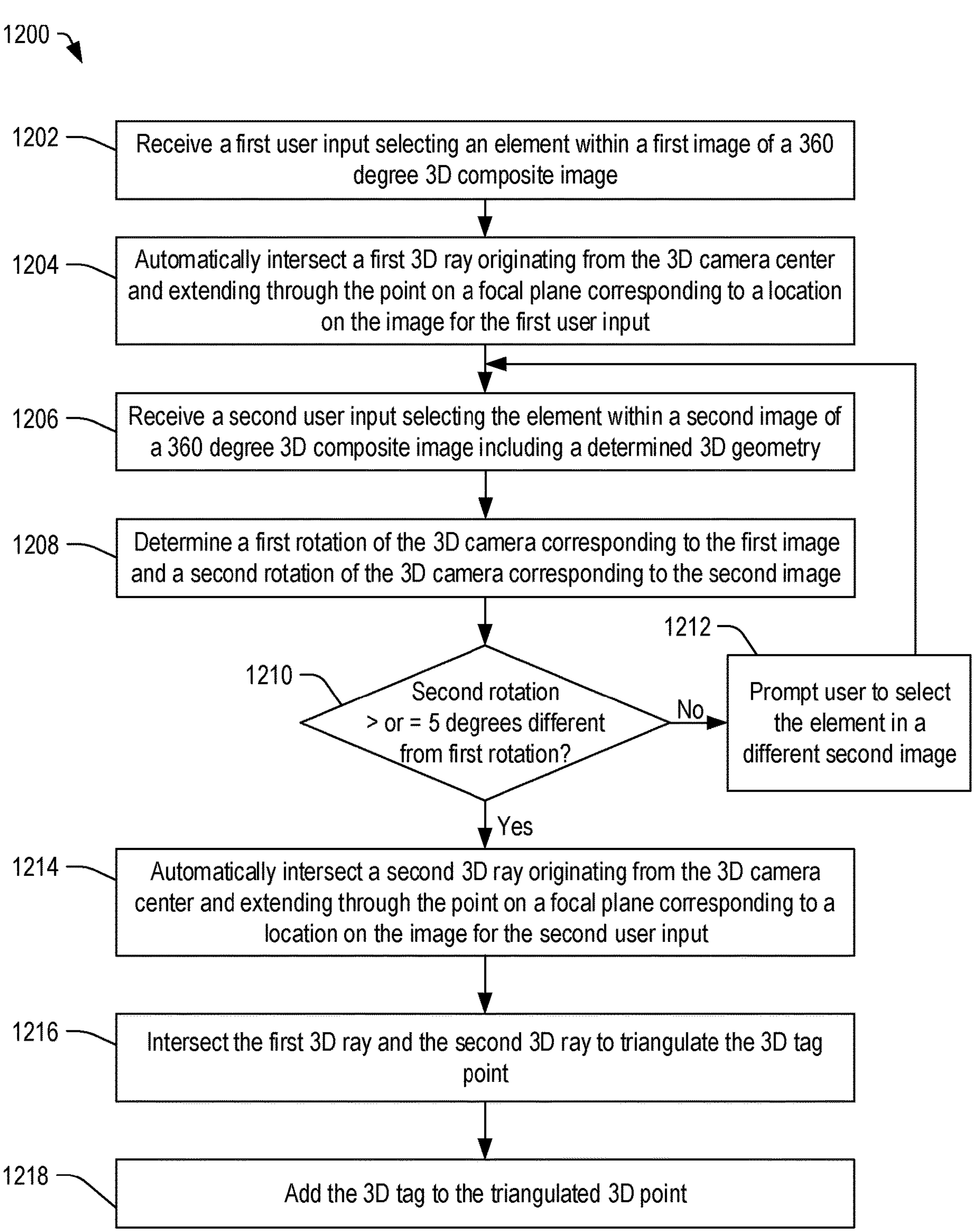
FIG. 12 depicts a method of tagging an element within a 360 degree three-dimensional composite image using two taps, in accordance with certain embodiments of the present disclosure.

FIG. 12 depicts a method 1200 of tagging an element within a 360 degree 3D composite image using two taps, in accordance with certain embodiments of the present disclosure. The method 1200 of FIG. 12 makes it possible to tag an element of an object from the 360 degree, 3D composite image. Additionally, the method 1200 allows the user to tag 3D points that may be floating (e.g., not part of the object, but part of one or more of the sequence of images included in the composite image). At 1202, the method 1200 may include receiving a first user input selecting an element within a first image of a 360 degree 3D composite image. The 360 degree 3D composite image may include a plurality of images that are already stabilized and linked to form a smooth 3D composite image of an object. The input may be received from user interactions with a graphical interface via an input interface of a computing device.

At 1204, the method 1200 can include automatically intersecting a first 3D ray originating from the 3D camera center and extending through the point on a focal plane corresponding to a location on the image for the first user input. In some embodiments, the ray may originate from the determined location of the 3D camera.

At 1206, the method 1200 may include receiving a second user input selecting the element within a second image of a 360 degree 3D composite image. The input may be received from user interactions with the graphical interface via the input interface of the computing device. In some embodiments, the second image may be separated from the first image by at least five degrees of rotation.

At 1208, the method 1200 may include determining a first rotation of the 3D camera corresponding to the first image and a second rotation of the 3D camera corresponding to the second image. At 1210, the method 1200 can include comparing the first and second rotations. At 1210, if the second rotation is less than five degrees different from the first rotation, the method 1200 may include prompting the user to select the element in a different second image, at 1212. The method 1200 may then return to 1206 to receive a second user input.

Otherwise, at 1210, if the second rotation is greater than or equal two at least five degrees different from the first rotation, the method 1200 may include automatically intersecting a second 3D ray originating from the 3D camera center and extending through the point on a focal plane corresponding to a location on the image for the second user input, at 1214. In some embodiments, the ray may originate from the determined location of the 3D camera.

At 1216, the method 1200 may include intersecting the first 3D ray and the second 3D ray to triangulate the 3D tag point on the image. It should be appreciated that any two user-chosen rays are unlikely to perfectly intersect in three dimensions. The triangulation performed by the system may determine a "best" 3D point that is closest to both of the rays. At 1218, the method 1200 may include adding the 3D tag to the triangulated 3D point. In an example, the 3D tag may be added to the 360 degree, 3D composite image, such that a 2D point in each image that includes the tagged element can be linked to the 3D tag, allowing for smooth rotation and display of the 3D tag as the composite image is rotated.

In certain embodiments, if a polygon mesh exists for the object (i.e., has been created by the system based on the image data), the two-tap method of FIG. 12 could be used in conjunction with the mesh by determining the intersection of the rays with the mesh. In some embodiments, the first and second 3D rays may not intersect one another, but rather may intersect one of the geometric shapes of the list of geometric shapes defining the polygon mesh. In an embodiment where the first 3D ray and the second 3D ray intersect two adjacent shapes of the polygon mesh, the system may be configured to select the point based on other factors, such as contrast, element identification within the image, other features that enable disambiguation of the selection, and so on. In some embodiments, if the selected element cannot be resolved from the received inputs, the interface may prompt the user to re-select the element within the 360 composite image. Alternatively, the mesh may be used to reliably associate a single user input selection with a 3D element corresponding to the user's selection. Other embodiments are also possible.

Figure 13:
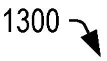
FIG. 13 depicts a flow diagram of a method of determining a three-dimensional geometry of an object, in accordance with certain embodiments of the present disclosure.
Figure 13:
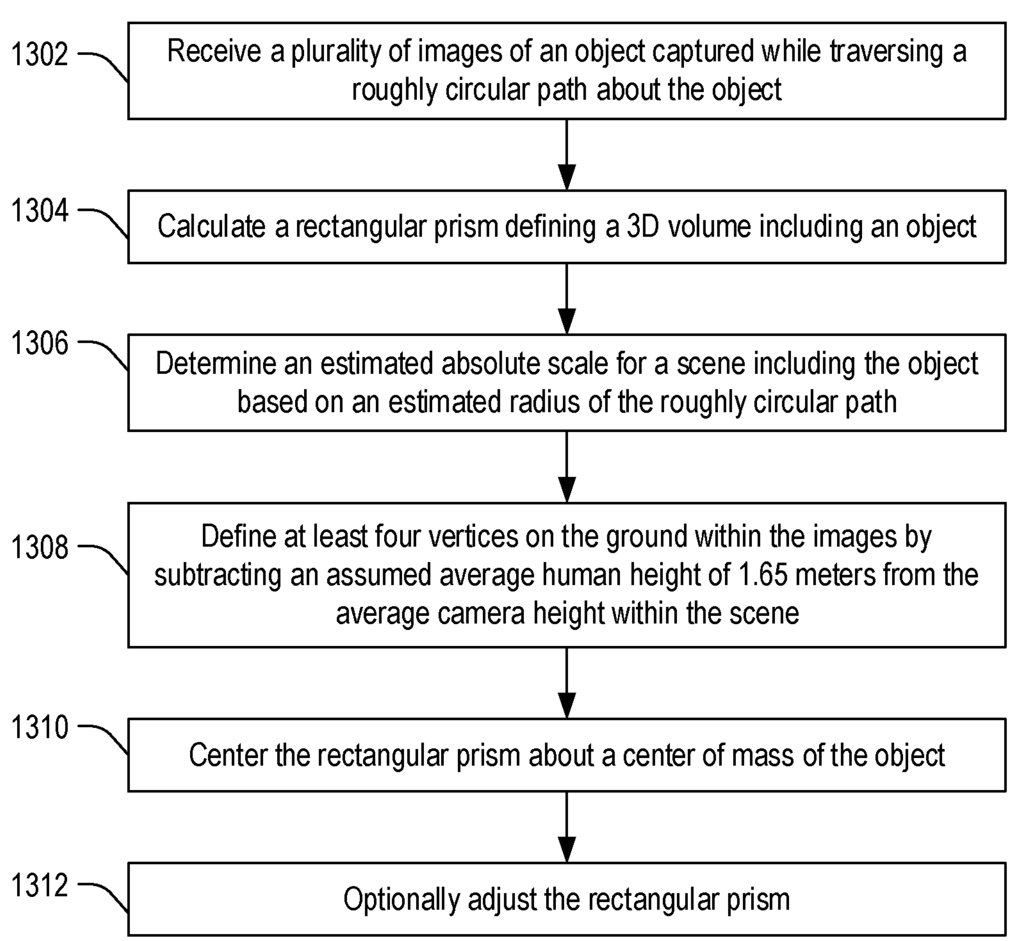

FIG. 13 depicts a flow diagram of a method 1300 of determining a 3D geometry of an object, in accordance with certain embodiments of the present disclosure. In this example, the 3D geometry may be determined using no information other than the recovered 3D camera locations and the computed center of mass of the object, such as a car.

At 1302, the method 1300 can include receiving a plurality of images of an object captured while traversing a roughly (substantially) circular path about the object. At 1304, the method 1300 can include calculating a rectangular prism defining a 3D volume including the object. In some embodiments, the rectangular prism may include twelve triangles connecting eight vertices describing a rectangular-shaped 3D volume in which we believe the object exists.

In an embodiment where the object is a car, the method may assume that the user walked in a roughly circular path around the car, such that the circular path has an estimated diameter of about eleven meters. At 1306, the method 1300 may include estimating an absolute scale for a scene including the object based on an estimated radius of the roughly circular path. At 1308, the method 1300 may include defining at least four vertices on the ground within the images by subtracting an assumed average human height of 1.65 meters from the average camera height within the scene.

At 1310, the method 1300 may include centering the rectangular prism around the center of mass of the object. With the following dimensions based on average car sizes (length of 4.5 meters, width of 1.9 meters, and height of 1.6 meters), the center of mass may be estimated from the dimensions. Further, it may be assumed that the first image was captured directly in front of the car, which assumption can be used to determine a direction of orientation of the 3D rectangular prism.

At 1312, the method 1300 may include adjusting the rectangular prism. In some embodiments, the rectangular prism may be adjusted according to elements of the object determined from the scene. In an example, the computing device may identify elements of the object within the scene, such as four 3D wheels of a car. In such an example, the computing system may adapt the rectangular prism to exactly fit the detected 3D wheels instead of relying on average car length and width values. The computing system may be configured to set the width of the rectangular prism to exactly equal or to substantially approximate the distance between the centers of the left and right wheels of the car (averaged over front and back pairs of wheels). Further, the length of the rectangular prism may be calculated to be approximately 1.6 times the distance between the centers of the front and rear wheels (averaged over left and right pairs of wheels). The height estimate may still be based on average car sizes.

In some embodiments, the rectangular prism may be adjusted based on information determined from a dense point cloud. In an example, the existing 360 imagery and camera poses can be used to compute a dense 3D point cloud of the scene. The vertices of an oblate spheroid, centered at the automobile's center of mass, may then be warped to best fit the points in the dense point cloud.

In other embodiments, the rectangular prism may be adjusted using a space carving approach. In this example, the computing device may be configured to divide the rectangular prism into a 3D grid of voxels. For every image in the scene (e.g., from each of the images forming the 3D composite image, the computing device may be configured to automatically segment the object, such as the car, from the background. The computing device may be configured to project each background pixel onto the voxel grid and eliminate any voxels that are touched by projected background pixels. After carving away the background pixels from each point of view, the remaining voxels can be understood to describe the 3D geometry of the object, e.g., the car. Using a Marching Cubes algorithm, the computing device may be configured to convert these voxels into a 3D mesh, a set of triangles compatible with the above-outlined 3D tagging procedure.

Figure 14:
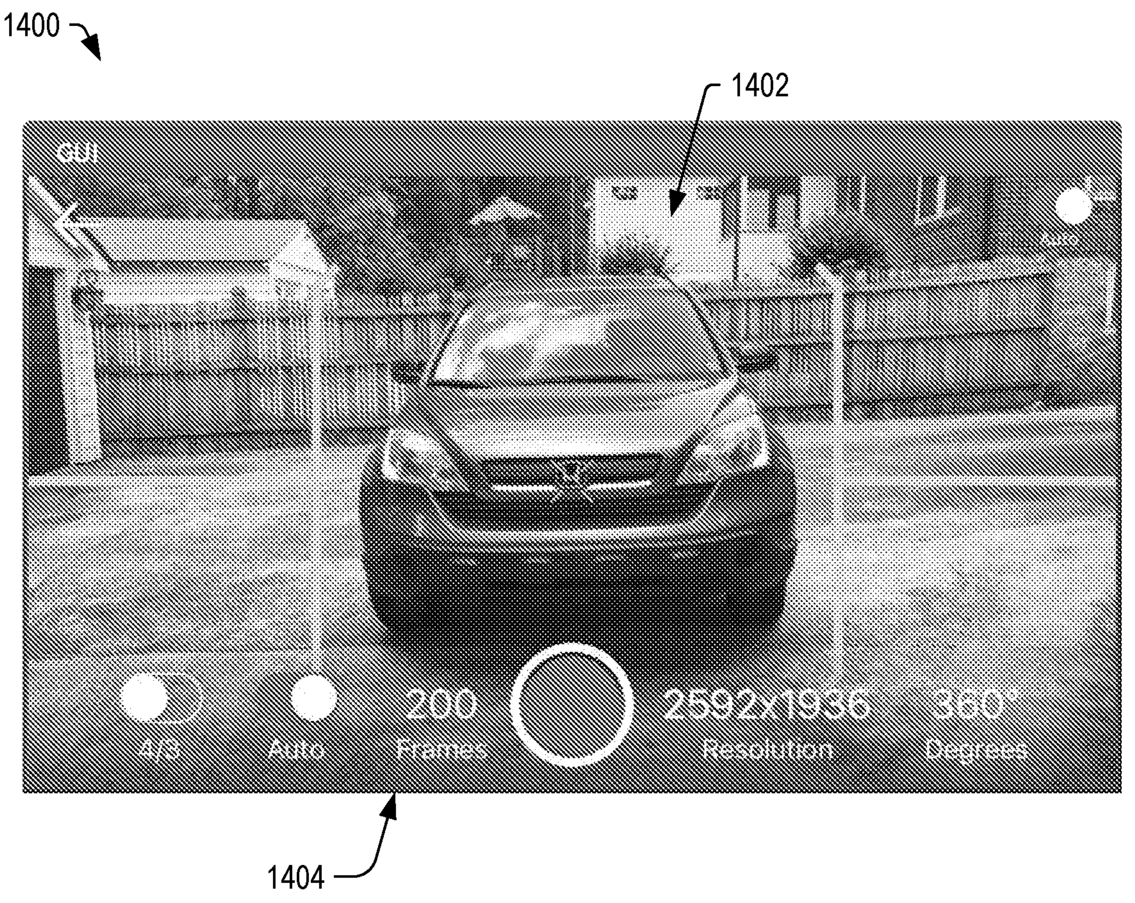
FIG. 14 depicts an interface including an image of a vehicle between visual alignment aids, in accordance with certain embodiments of the present disclosure.

FIG. 14 depicts an interface 1400 including an image of a vehicle 1402 between visual alignment aids, in accordance with certain embodiments of the present disclosure. The interface 1404 may include a count of the number of frames or images captured to complete the 360-degree composite image and alignment aids to assist the user in maintaining a consistent orientation as the user traverses the path about the object. In some embodiments, the visual alignment aids may include brackets superimposed on the live camera view on the display to indicate to the user where and how large the object should appear to be in the frame. The spacing of the brackets of the visual alignment aids may change as the user moves around the object to accommodate the changing apparent shape of an automobile when viewed from different angles. In a particular example, the brackets may represent dynamic gyro-based alignment aids that can be viewed by the user to adjust his or her camera angle. In an example, the visual alignment aids may be narrower when viewed from the front or back and wider when viewed from the left or right sides. In some embodiments, the visual alignment aids may be a particular color by default (such as a green color) and may change color as the user rolls the camera too far away from an ideal horizontal roll angle. In an example, the color may change from the default green color to become more and more red in color as the image capture device rolls further from the ideal in either the clockwise or counter clockwise direction.

In certain embodiments, the interface 1400 may be presented as an application executing on a computing device, such as a smart phone, a tablet computer, or another portable computing device. The interface 1400 may enable an automated 360-degree composite image capture. For example, in certain embodiments, after pressing a start button, the computing device may automatically capture images as the user walks around the subject or object. The application may cause the processor of the computing device to automatically capture an image each time a gyroscope sensor of the computing device reports that the device has rotated an additional X degrees around the subject or object. The variable (X) may be determined based on a target number of images to be captured. By default, the application may cause the processor to capture 360 degrees of images. In some embodiments, the user may specify a different target number of degrees (D), such as ninety degrees. Once the gyroscope sensor indicates that images have been captured that correspond to the target number of degrees, the application may cause the device to stop capturing the images.

In certain embodiments, the computing device may stop capturing images based on one of three possible options: 1) the user manually stops the image capture process by pressing a button within the application; 2) the device's gyroscope sensor determines that the computing device has completed the D-degree rotation about the object and the processor automatically stops the image capture process; and 3) the device's gyroscope sensor reports that the user has stopped rotating around the object for some period of time (such as a small number of seconds) after almost completing the D-degree rotation about the object and the processor automatically stops the image capture process. In the illustrated example, the 360-degree image capture was stopped when the gyroscope sensor indicated that the user has traced a 360 degree path, capturing images at various intervals along the path.

Figure 15:
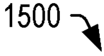
FIG. 15 illustrates the interface of FIG. 14 including an indicator showing a change in the orientation of the computing device, in accordance with certain embodiments of the present disclosure.
Figure 15:
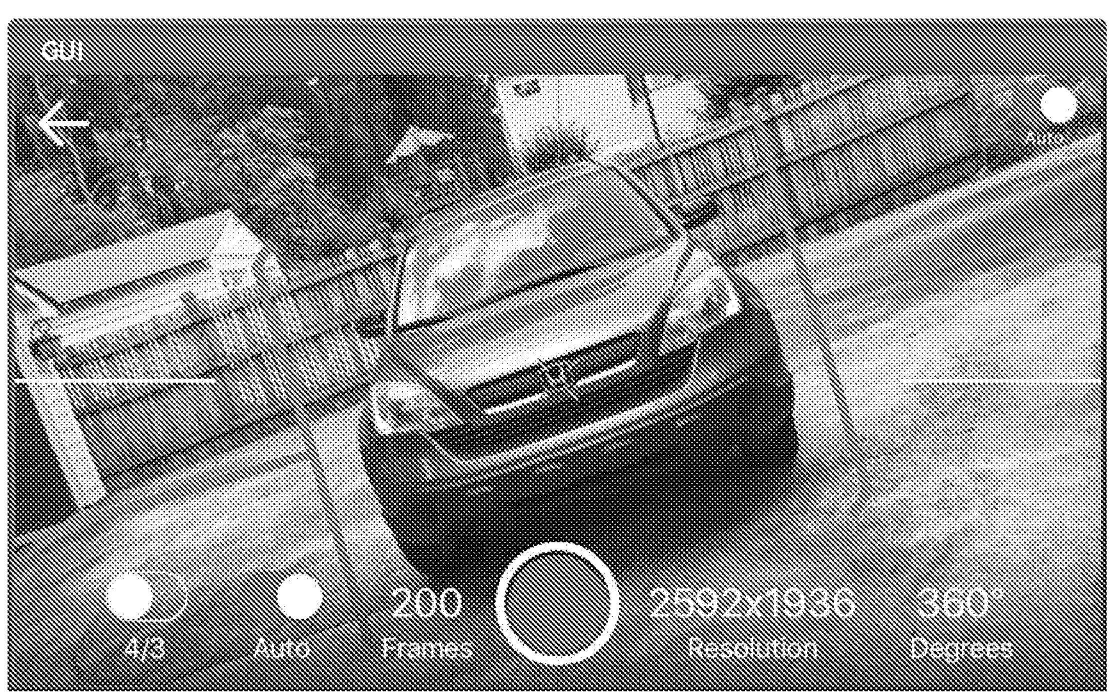

FIG. 15 illustrates an embodiment 1500 of the interface of FIG. 14 including an indicator showing a change in the orientation of the computing device, in accordance with certain embodiments of the present disclosure. In the illustrated embodiment, the interface 1500 provides visual feedback indicating a change with regard to the viewing angle. During image capture, the interface 1500 may show alignment aids, which may change color if the gyroscope sensor determines that the orientation of the camera has changed as compared to the first captured image by an amount that is greater than a threshold amount. In an example, the alignment aids may include lines, corners, or other visual elements that can be superimposed on the image adjacent to the boundaries of the object to be imaged to assist the user to capture the object.

Figure 16:
FIG. 16 depicts the interface of FIG. 14 at a start of the 360-degree composite image capture process, in accordance with certain embodiments of the present disclosure.

FIG. 16 depicts an embodiment 1600 of the interface of FIG. 14 at a start of the 360-degree composite image capture process, in accordance with certain embodiments of the present disclosure. As discussed above, the alignment aids may be provided to assist the user in centering the object. It should be appreciated that the alignment aids are superimposed on the captured image data and may adjust to remain outside the boundaries or edges of the object as the user moves. In this example, the initial image shows a zero (0) degree progress along the path around the object.

Figure 17:
FIG. 17 depicts the interface of FIG. 14 including an image of a vehicle taken at approximately 58 degrees of rotation during the 360-degree composite image capture process, in accordance with certain embodiments of the present disclosure.

FIG. 17 depicts an embodiment 1700 of the interface of FIG. 14 including an image of a vehicle taken at approximately 58 degrees of rotation during the 360-degree composite image capture process, in accordance with certain embodiments of the present disclosure. The interface 1700 includes a circular indicator showing a number of degrees that the user has moved about the object. This information may be displayed based on the gyroscope sensor information, which is the same information that can be used for the automatic image capture and automatic stopping. Showing the gyroscope sensor-based rotation angle lets the user see how quickly the angle is changing and how quickly images are being captured. This feedback allows the user to adjust his or her walking speed, and provides confirmation that the device has detected rotation about the object. In some embodiments, the gyroscope sensor information may be presented within a circle having a semi-transparent color (such as gray), where the circle can fill up with a more opaque color as the user completes the 360 degrees of the circle.

Figure 18:
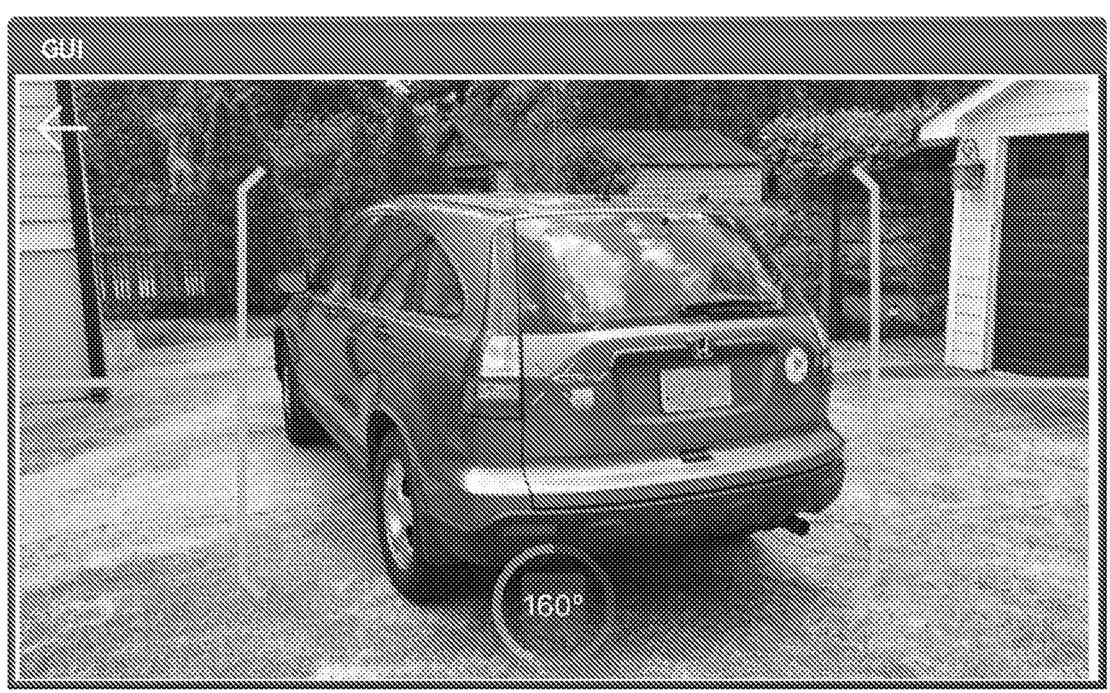
FIG. 18 depicts the interface of FIG. 14 including an image of a vehicle taken at approximately 160 degrees of rotation during the 360-degree composite image capture process, in accordance with certain embodiments of the present disclosure.

FIG. 18 depicts an embodiment 1800 of the interface of FIG. 14 including an image of a vehicle taken at approximately 160 degrees of rotation during the 360-degree composite image capture process, in accordance with certain embodiments of the present disclosure. The alignment aids may be provided to assist the user in centering the object and are adjusted relative to the size of the object (vehicle).

Figure 19:
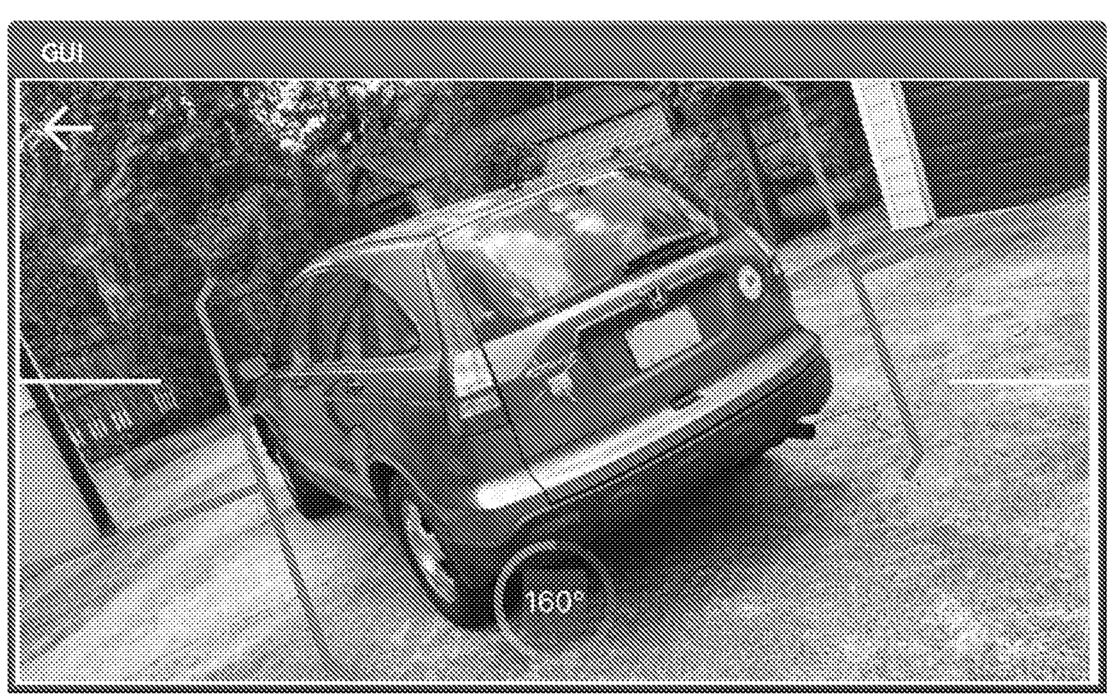
FIG. 19 depicts the interface of FIG. 18 including an indicator showing a change in the orientation of the computing device, in accordance with certain embodiments of the present disclosure.

FIG. 19 depicts an embodiment 1900 of the interface of FIG. 18 including an indicator showing a change in the orientation of the computing device, in accordance with certain embodiments of the present disclosure. The alignment aids may change color, flash or otherwise indicate that the orientation of the camera has changed. In one possible embodiment, the orientation of the camera at the beginning of the image capture process may establish an initial orientation, and the system may be configured to encourage the user to maintain a consistent orientation throughout the image capture process. When the user tilts the image capture device by more than a threshold amount, the alignment aids may flash, change color, or change other visual characteristics to alert the user to correct the orientation of the image capture device relative to the object.

Figure 20:
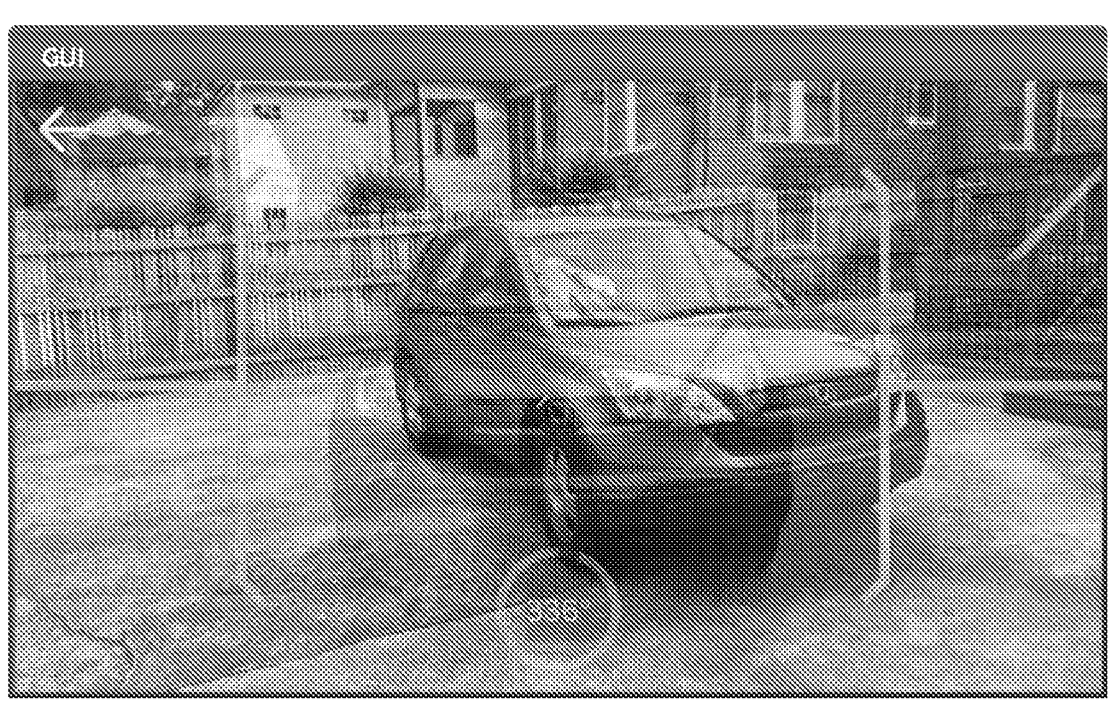
FIG. 20 depicts the interface of FIG. 14 including a semi-transparent overlay of the first captured image superimposed on a live camera image that is approximately 336 degrees, in accordance with certain embodiments of the present disclosure.

FIG. 20 depicts an embodiment 2000 of the interface of FIG. 14 including a semi-transparent overlay of the first captured image superimposed on a live camera image that is approximately 336 degrees, in accordance with certain embodiments of the present disclosure. The GUI 2000 depicts the object image after 336 degrees of image capture has been completed. In some embodiments, when capturing a full 360 degree set of images, if the image capture device's gyroscopic sensor reports that the device is within 15 degrees of completing the 360-degree rotation, a semi-transparent overlay of the first captured image can be superimposed on top of the live camera feed to assist the user to adjust the distance and angle of the image capture device to the subject in order to achieve close-to-exact alignment between the first and last frames of the image capture process.

Figure 21:
FIG. 21 depicts the interface of FIG. 14 including a semi-transparent overlay of the first captured image superimposed on a live camera image that is approximately 354 degrees, in accordance with certain embodiments of the present disclosure.

FIG. 21 depicts an embodiment 2100 of the interface of FIG. 14 including a semi-transparent overlay of the first captured image superimposed on a live camera image that is approximately 354 degrees, in accordance with certain embodiments of the present disclosure. In this example, the semi-transparent overlay of the first captured image is relatively close to the alignment of the current image.

Figure 22:
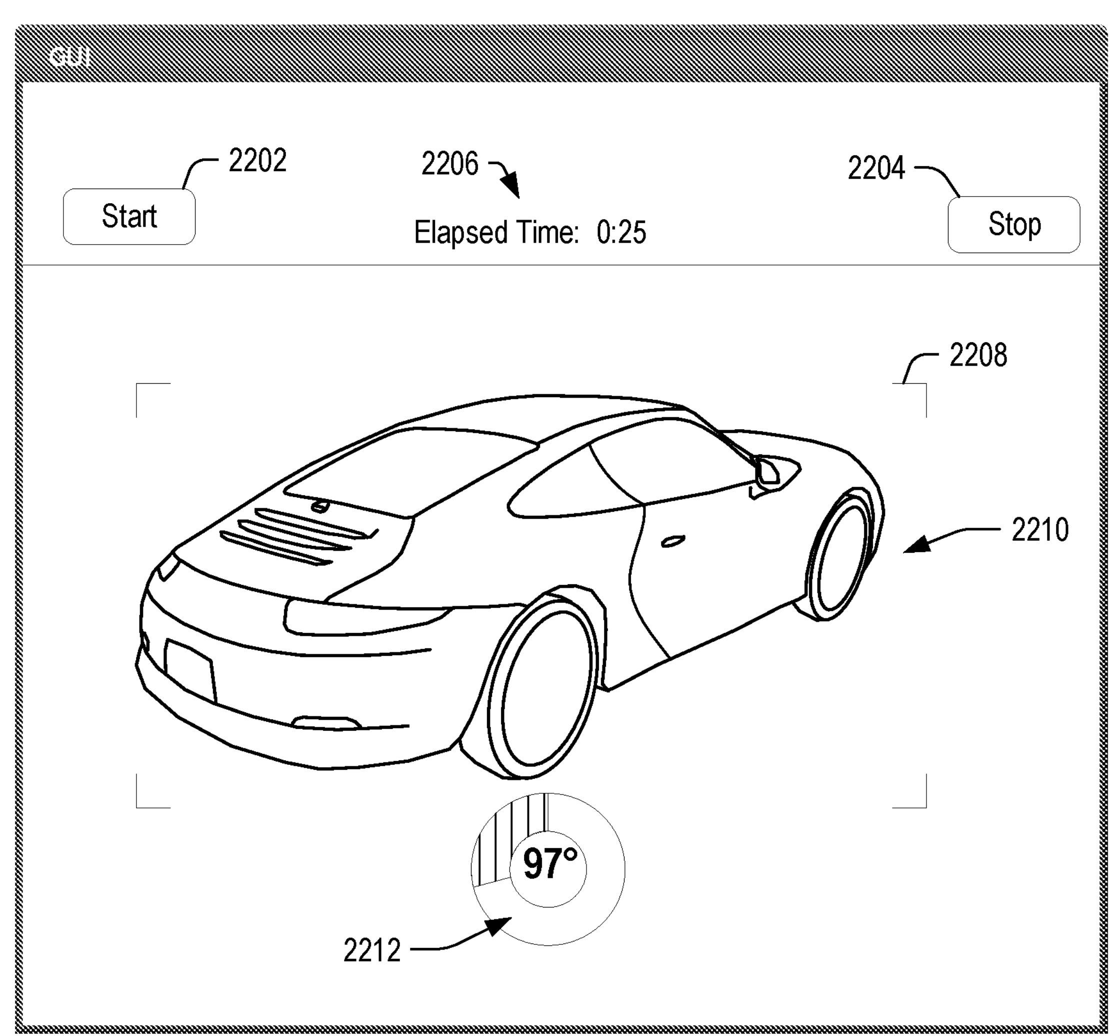
FIG. 22 depicts an alternative view of the interface including image alignment aids, in accordance with certain embodiments of the present disclosure.

FIG. 22 depicts an alternative view of the interface 2200 including image alignment aids 2208, in accordance with certain embodiments of the present disclosure. In this example, the interface 2200 may include a start button 2202, a stop button 2204 and an elapsed time 2206 corresponding to the amount of time that has elapsed during the current image capture operation. Further, the interface 2200 may include an object 2210 centered between the alignment aids 2208. Further, the interface 2200 can include an indicator 2212 that depicts a number of degrees by which the user has rotated around the object 2210. The indicator 2212 may be based on the gyroscopic sensor of the image capture object, and can be the same number that is used for automatic image capture and automatic stopping of the image capture process. In some embodiments, displaying the gyroscopic sensor based rotation angle provides the user visual feedback of how fast the angle is changing and therefore how quickly images are being captured. This feedback can allow the user to adjust his or her walking speed, and provides confirmation that the device has successfully detected the user's movement around the subject. The indicator 2212, in addition to providing the gyroscope's measurement angle, may include a transparent gray circle that fills up with a more opaque gray as the user completes the 360 degrees of the circle. Other embodiments are also possible.

Figure 23:
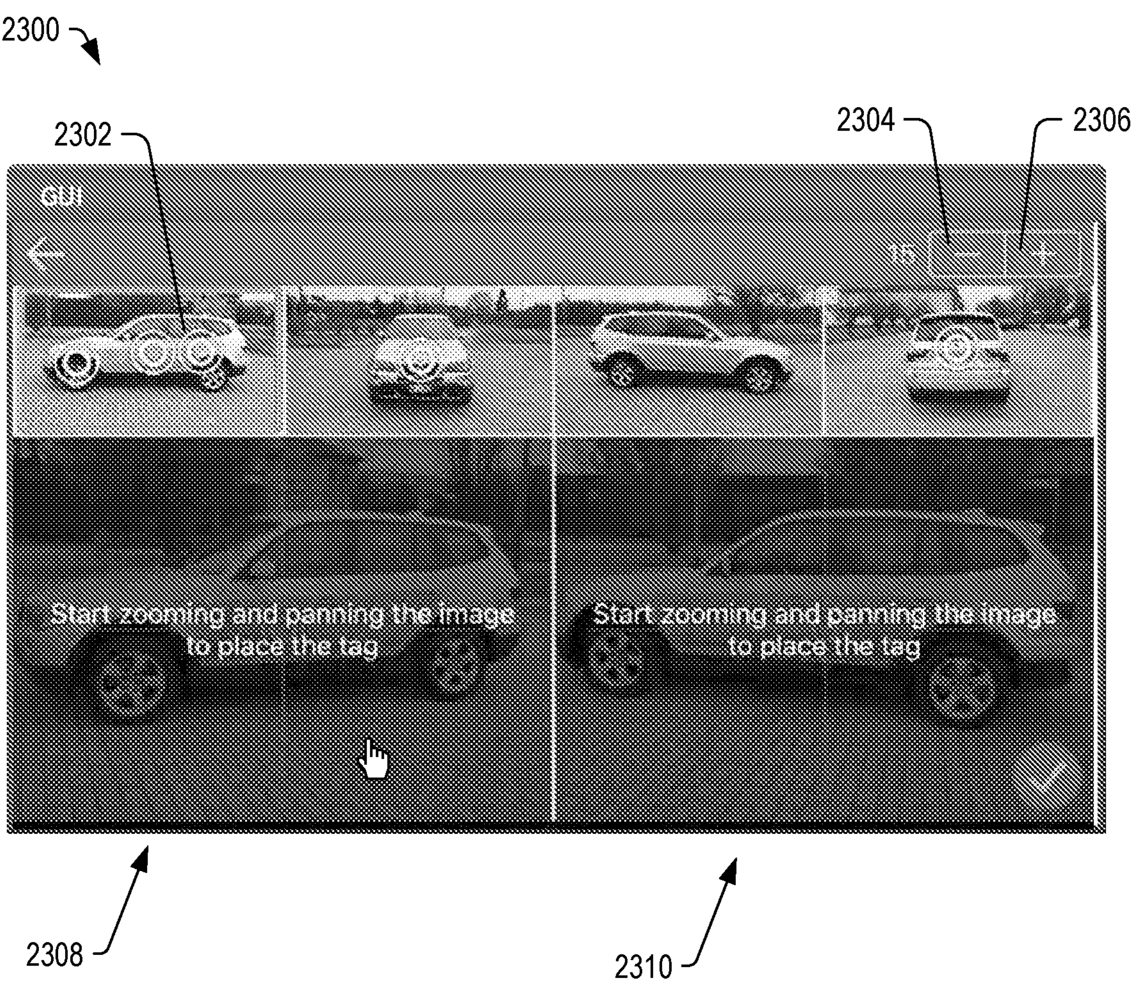
FIG. 23 depicts an interface accessible by a user to define a three-dimensional point and including a selected reference image and two views related to the reference image, in accordance with certain embodiments of the present disclosure.

FIG. 23 depicts an interface 2300 accessible by a user to define a three-dimensional point and including a selected reference image and two views related to the reference image, in accordance with certain embodiments of the present disclosure. The interface 2300 can be used to specify a three-dimensional point within a three-dimensional scene reconstructed from two-dimensional images. The interface 2300 may be configured to implement a novel technique for triangulating a three-dimensional point from two images.

In the illustrated example, the interface 2300 includes four reference thumbnail images (which may be automatically selected by the system), one of which is selected and generally indicated at 2302. The four reference thumbnail images may include images at zero-degrees, ninety-degrees, one hundred eighty degrees, and two hundred seventy degrees selected from the 360-degree image capture operation. The reference images may be selected from substantially evenly spaced photographs from the captured set, which are displayed across the top of the interface 2300. The interface 2300 may include user-selectable buttons 2304 and 2306 that can be accessed by the user to scroll through the images to select a different set of four reference images. In this example, the user has selected the thumbnail image 2302.

In response to selection of the image 2302, the lower portion of the interface 2300 may display two additional images on the bottom half of the interface 2300 corresponding to a specified amount of rotation (in this case fifteen degrees) to the left and right of the reference image, respectively for the left image 2308 and the right image 2310. These images are separated by at least X-degrees for triangulating points, similar to the triangulation points in FIG. 12.

In some embodiments, the interface 2300 may provide instructions that instruct the user to use a two-finger pinch-to-zoom gesture to zoom, pan, and center the same point in both the left image 2308 and the right image 2310 to designate a point for a three-dimensional tagging operation.

Figure 24:
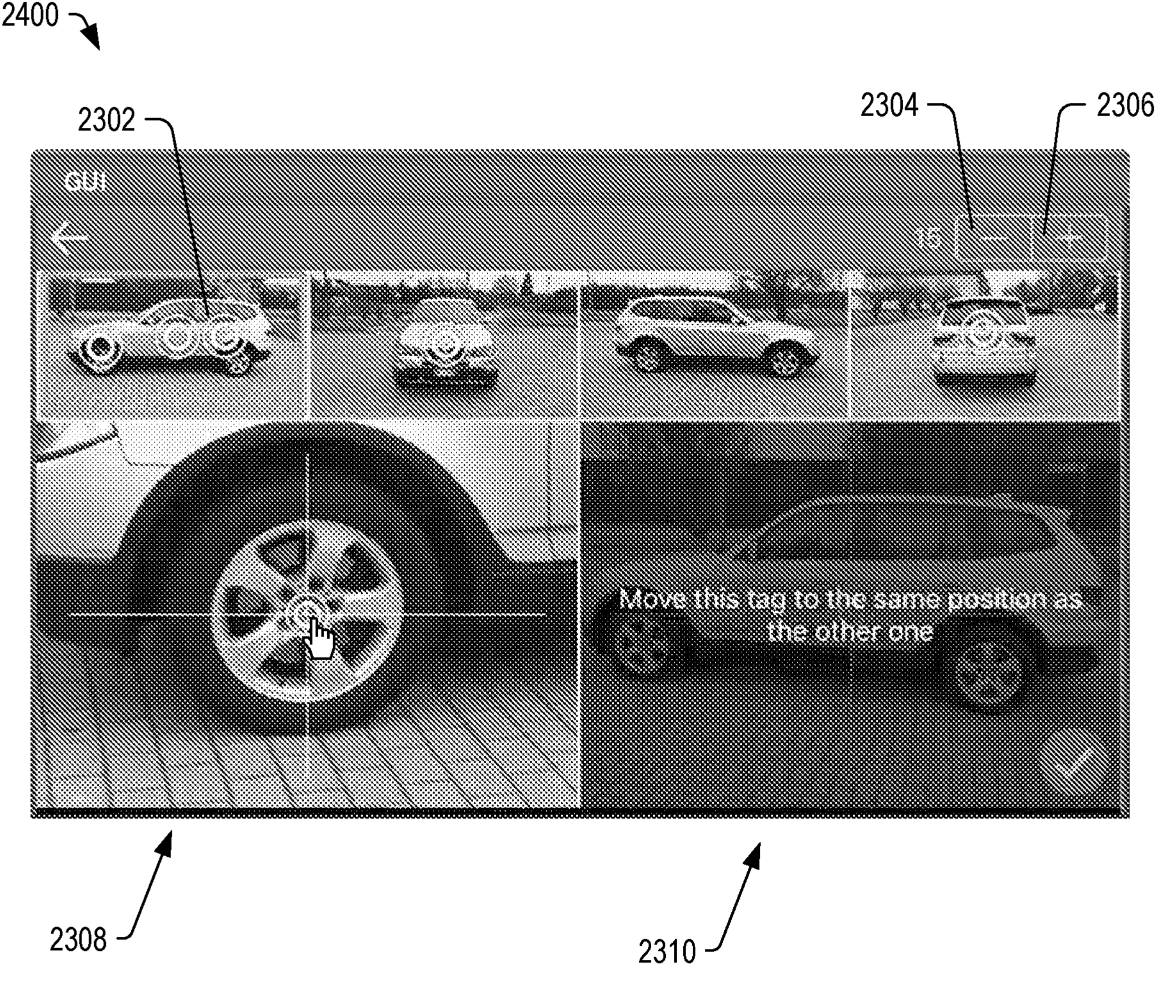
FIG. 24 depicts the interface of FIG. 23 including one of the views of the reference image pinched, zoomed, panned, and centered to select the three-dimensional point, in accordance with certain embodiments of the present disclosure.

FIG. 24 depicts an embodiment 2400 of the interface 2300 of FIG. 23 including one of the views of the reference image pinched, zoomed, panned, and centered to select the three-dimensional point, in accordance with certain embodiments of the present disclosure. In the illustrated example, the user has pinched, zoomed, panned, and centered the left image 2308 to center the image on the tire of the vehicle.

Figure 25:
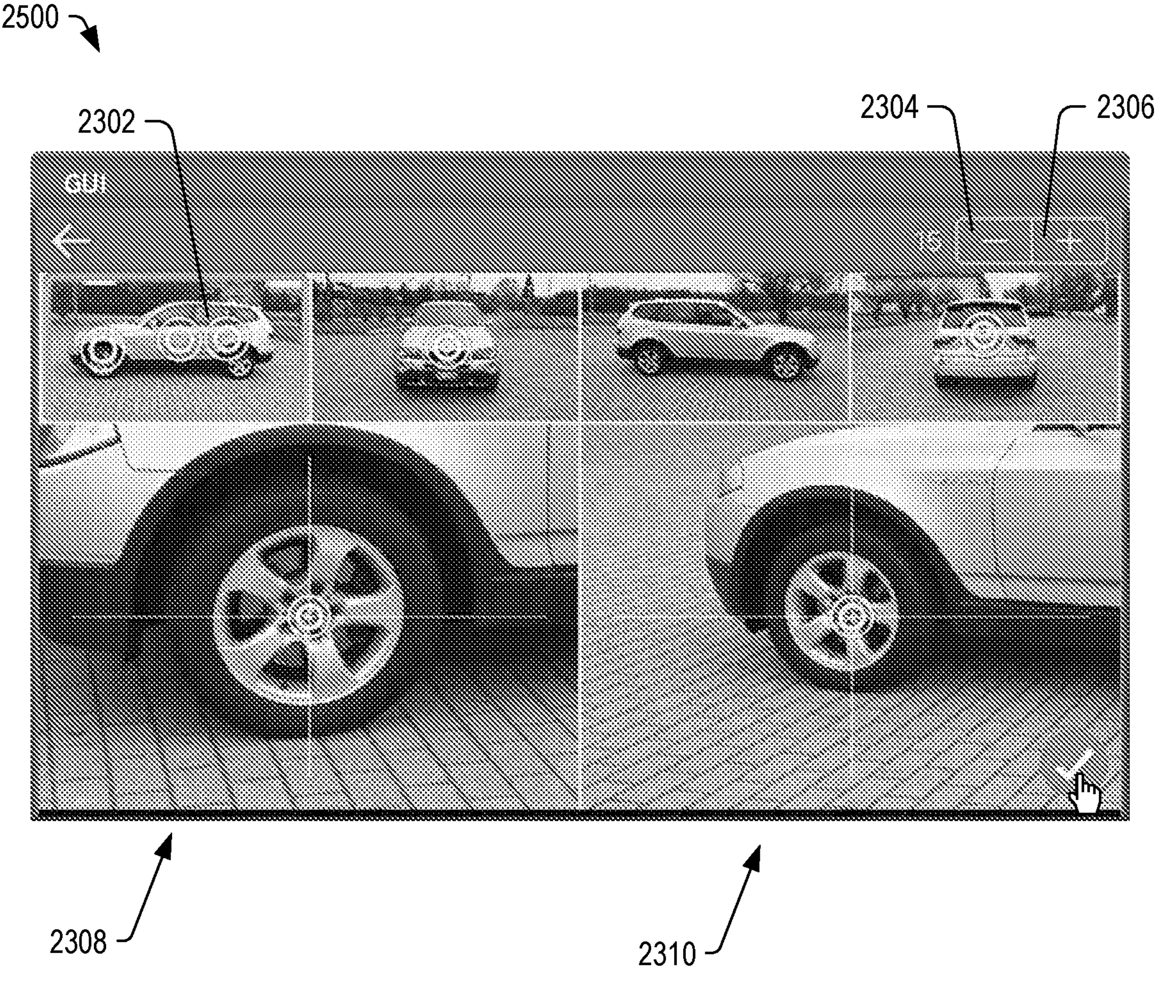
FIG. 25 depicts the interface of FIG. 24 including a second of the views of the reference image pinched, zoomed, panned, and centered to select the three-dimensional point, in accordance with certain embodiments of the present disclosure.

FIG. 25 depicts an embodiment 2500 of the interface of FIG. 24 including a second of the views of the reference image pinched, zoomed, panned, and centered to select the three-dimensional point, in accordance with certain embodiments of the present disclosure. In the illustrated embodiment 2500, the user has pinched, zoomed, panned, and centered the right image 2310 to also select the tire.

When finished zooming in to the same point in both the left image 2308 and the right image 2310, the user may select or tap the green check mark to accept the chosen points (identified by the selections in the left image 2308 and the right image 2310). From these two points, triangulation and creation of the three-dimensional point occurs as described in FIG. 12.

Figure 26:
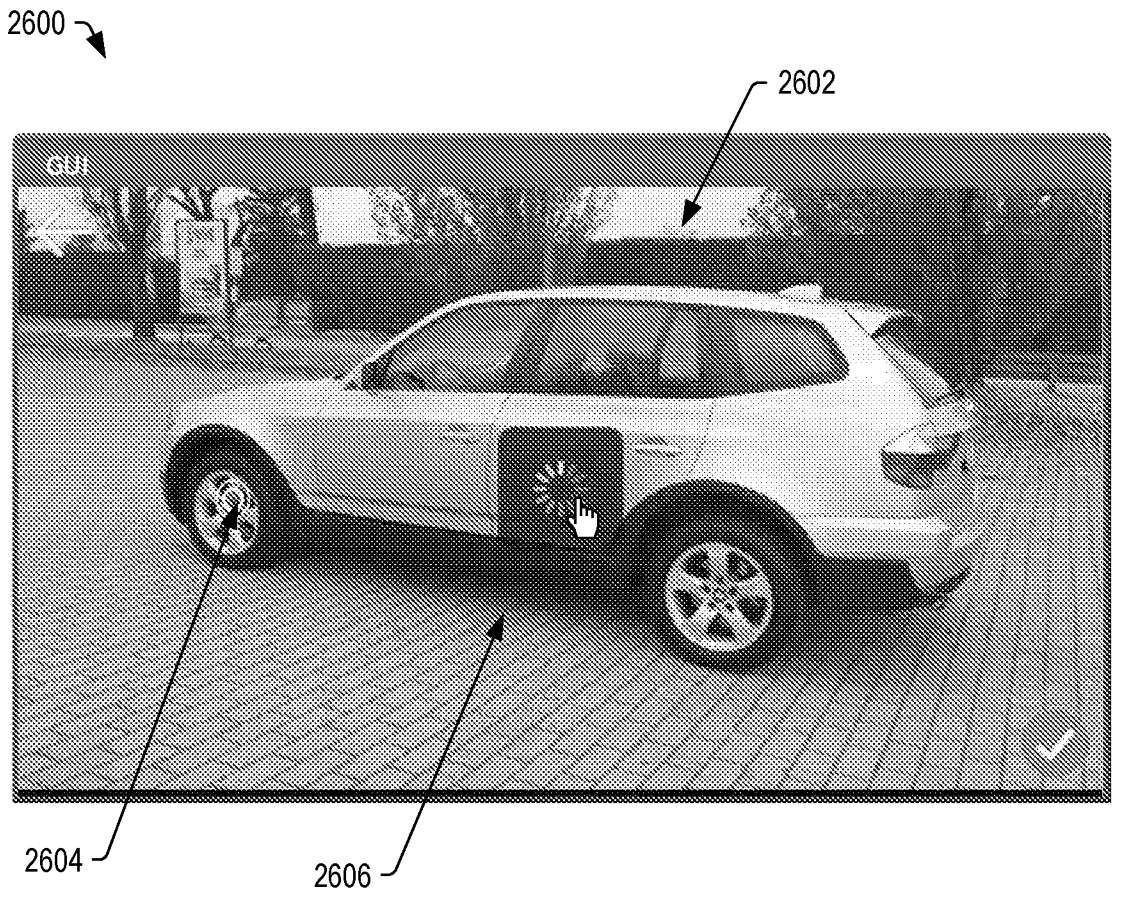
FIG. 26 depicts an interface including the 360-degree composite image and including a "wait" indicator as the interface opens a tag labeling interface to label the three-dimensional point, in accordance with certain embodiments of the present disclosure.

FIG. 26 depicts an interface 2600 including the 360-degree composite image 2602 and including a "wait" indicator 2606 as the interface opens a tag labeling interface to label the three-dimensional point, in accordance with certain embodiments of the present disclosure. The system may then update the interface 2600 to depict an animation of how the triangulated three-dimensional point maps into each of the images in the 360-degree captured images. If the user is satisfied with the results of the animation, the user may tap or select the green check mark again to accept the new three-dimensional point (or the user may "go back" to reselect the two points).

Figure 27:
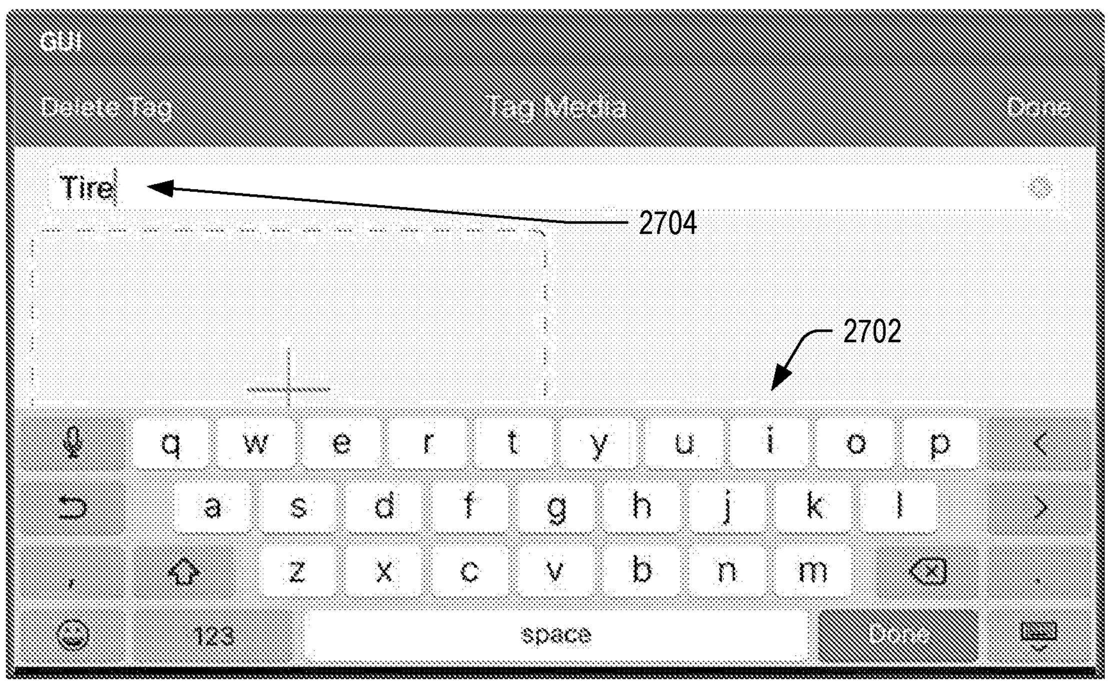
FIG. 27 depicts the interface including a labeling interface accessible by the user to label the three-dimensional tag, in accordance with certain embodiments of the present disclosure.

FIG. 27 depicts the interface 2700 accessible by the user to label the three-dimensional tag, in accordance with certain embodiments of the present disclosure. The interface 2700 can be used to add text, images, video, or any combination thereof for association with the three-dimensional point. In this example, the interface 2700 includes a text input 2704 and a keypad 2702 accessible by a user to label the three-dimensional tag.

Once the user selects the "Done" button, the tag labeling operation may be complete. Subsequently, the user may double-tap (double-click) on the newly created three-dimensional tag to see the images stabilized around the three-dimensional point associated with the three-dimensional tag.

Figure 28:
FIG. 28 depicts the interface including the 360-degree composite image and including a three-dimensional rotation point, in accordance with certain embodiments of the present disclosure.

FIG. 28 depicts an interface 2800 including the 360-degree composite image and including a three-dimensional rotation point, in accordance with certain embodiments of the present disclosure. The interface 2800 can include a visual floating three-dimensional tag augmenting the images of the scene. The three-dimensional tag can be configured to disappear when it is occluded by the automobile, and should be perspectively distorted when it is viewed from different angles. To provide such perspective distortion, the system may require knowledge of the orientation of the three-dimensional point (the surface normal of the three-dimensional point) to know from which angle the three-dimensional point should be visible and how its appearance should change.

The selected reference image can serve an important purpose. In particular, the system may assume that the three-dimensional point lies on a three-dimensional surface oriented perpendicular to the camera viewing angle in the selected reference image. In the case of an automobile captured in three hundred sixty degrees, the four reference images in FIGS. 23 and 24 may correspond to the front, left side, back, and right side of the car, such that all created three-dimensional tags can be oriented in those four principal directions, allowing proper integration in the three-dimensional scene, including perspective distortion and proper occlusion when rotating around the vehicle.

It should be appreciated that the above description represents one possible interface for specifying a three-dimensional point. Other embodiments are also possible. Further, it should be appreciated that each three-dimensional point may also be used as a rotation point. In an alternative embodiment, the interface may present the user with a top view of the scene with camera locations forming a ring around the vehicle. The user may then interact with the interface to drag around or otherwise alter the three-dimensional center of rotation, just as a user might manipulate a three-dimensional element in a computer-aided design (CAD) program (rather than triangulating the point in the original images or intersecting with three-dimensional geometry as in FIGS. 11 and 12). An animation of the rotating stabilized set of images can then be changed in real-time as the user alters the center of rotation.

Figure 29A:
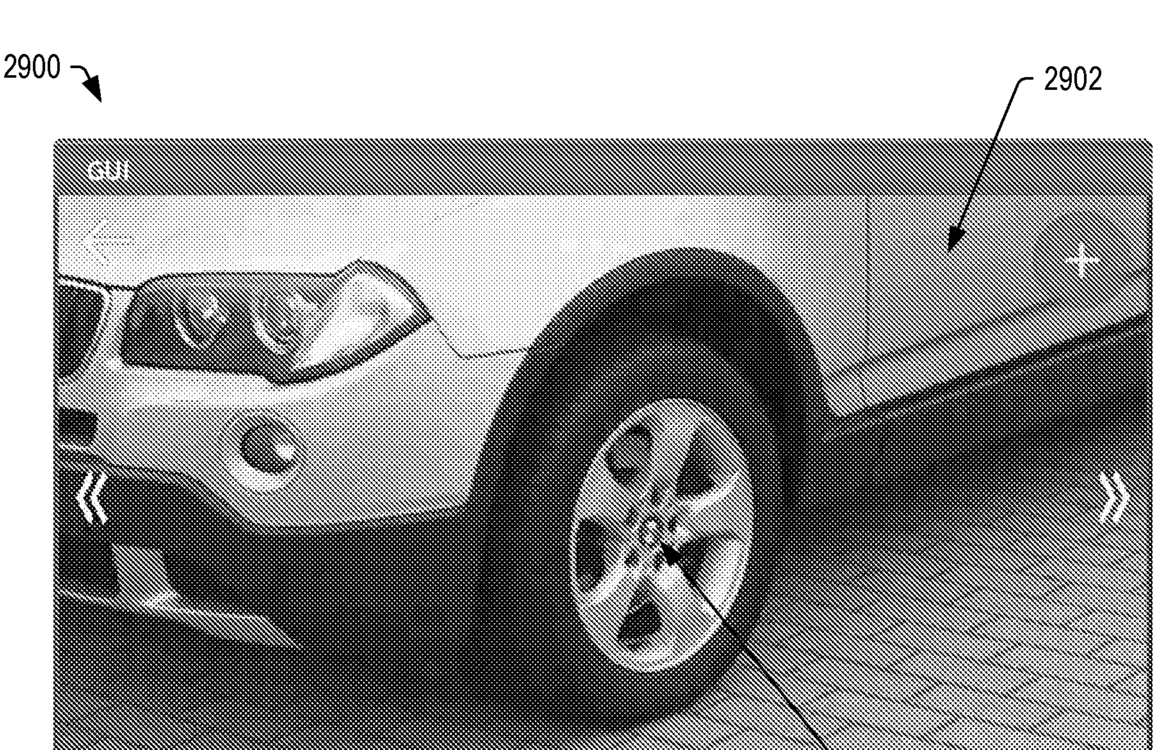
FIGS. 29A and 29B depict view of the 360-degree composite image rotated about the three-dimensional rotation point of FIG. 28, in accordance with certain embodiments of the present disclosure.
Figure 29B:
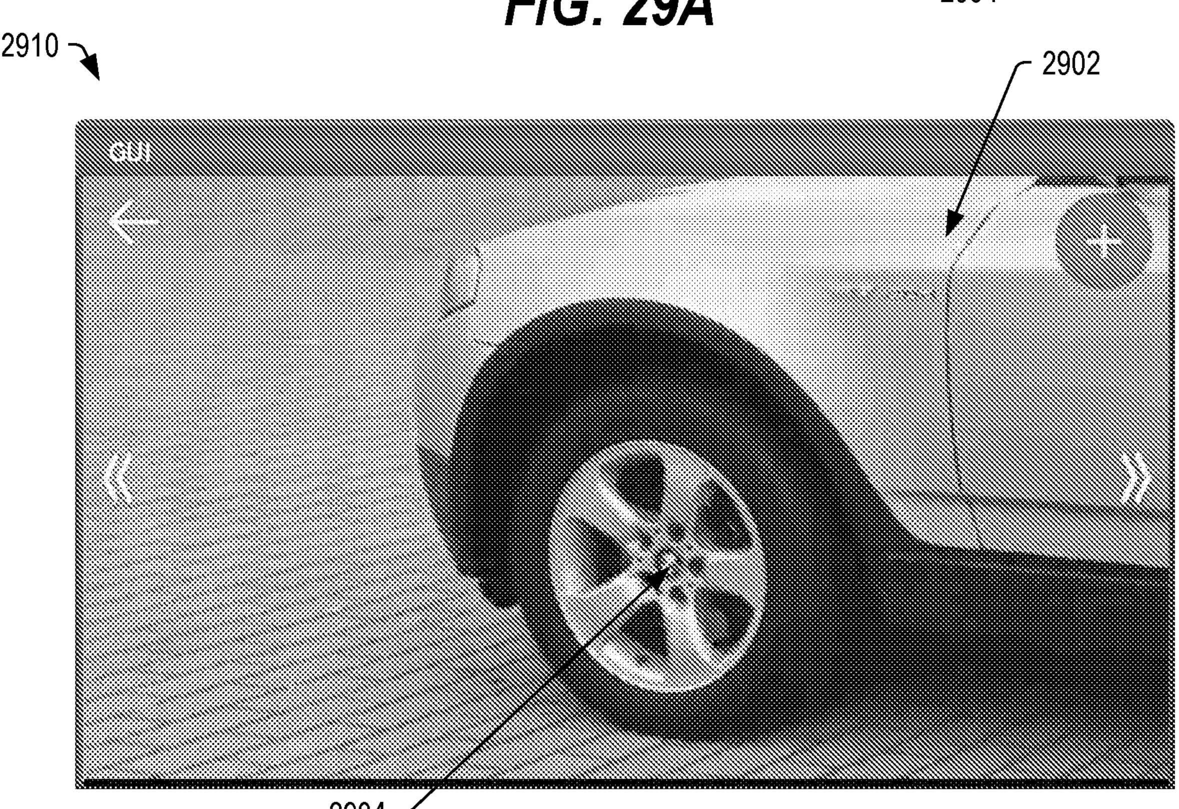

FIGS. 29A and 29B depict views of the 360-degree composite image rotated about the three-dimensional rotation point of FIG. 28, in accordance with certain embodiments of the present disclosure. In FIG. 29A, an interface 2900 includes an image 2902 rotated in a first direction about a three-dimensional point 2904. In FIG. 29B, an interface 2910 includes the image 2902 rotated in a second direction about the three-dimensional point 2904.

For a given set of images and an associated set of three-dimensional tags, the system can be configured to display an automated tour of the vehicle and associated three-dimensional tags by automatically transitioning between rotating around the vehicle's center of mass and rotating around each individual three-dimensional tag. In some embodiments, the system may be configured to transition automatically from rotating around one three-dimensional tag directly to rotating around a different three-dimensional tag. The transitions can be performed seamlessly by interpolating between three-dimensional rotation points, such that there is no jarring transition or jump from one view to another.

Figure 30:
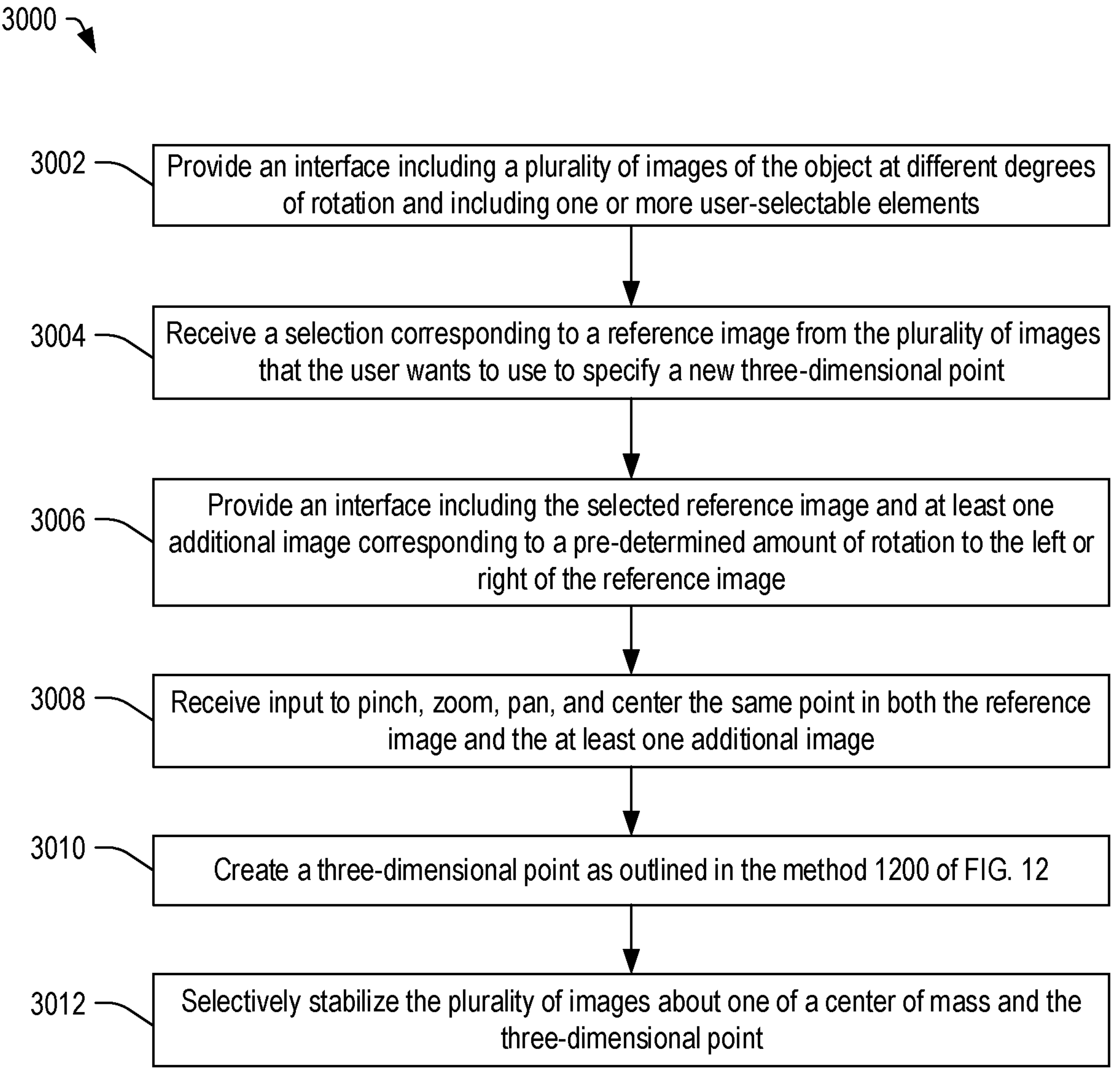
FIG. 30 depicts a flow diagram of a method of providing a 360-degree composite image stabilized about one of a center of mass and a three-dimensional rotation point, in accordance with certain embodiments of the present disclosure.

FIG. 30 depicts a flow diagram of a method 3000 of providing a 360-degree composite image stabilized about one of a center of mass and a three-dimensional rotation point, in accordance with certain embodiments of the present disclosure. At 3002, the method 3000 can include providing an interface including a plurality of images of the object at different degrees of rotation and including one or more user-selectable elements. At 3004, the method 3000 may include receiving a selection corresponding to a reference image from the plurality of images that the user wants to use to specify a new three-dimensional point.

At 3006, the method 3000 may include providing an interface including the selected reference image and at least one additional image corresponding to a pre-determined amount of rotation to the left or right of the reference image. At 3008, the method 3000 can include receiving an input to pinch, zoom, pan, and center the same point in both the reference image and the at least one additional image.

At 3010, the method 3000 may include creating a three-dimensional point as outlined in the method of FIG. 12. At 3012, the method 3000 can include selectively stabilizing the plurality of images about one of a center of mass and the three-dimensional point. Other embodiments are also possible.

While the above embodiments assume image capture by an image capture device, such as a computing device, in an alternative embodiment, the three-dimensional model can be created from images or imported three dimensional models of a specific vehicle from different sources. For example, a three-dimensional CAD model of a specific year, make, and model of an automobile may be used to generate the 360-degree composite image. In this example, instead of computing/reconstructing a three-dimensional model of the automobile from the images, the existing three-dimensional model may be aligned with the entire set of images. Aligning the existing three-dimensional model with the images may include single-tap three-dimensional tagging. Further, such alignment may enable a single-tap selection of a new three-dimensional rotation point as well as background removal in each image. Further, such alignment can enable physical measurement of objects in each image as well as augmented-reality visualization of color changes and physical modifications to the car, among other capabilities. Physical measurements become possible when physical dimensions are associated with the imported three-dimensional CAD model of the car. After alignment, the sparse three-dimensional point cloud and camera locations computed during bundle adjustment can be converted from an unknown physical scale to the known physical scale of the three-dimensional CAD model, thus enabling physical measurements between any three-dimensional points derived from the images or between camera positions.

Figure 31:
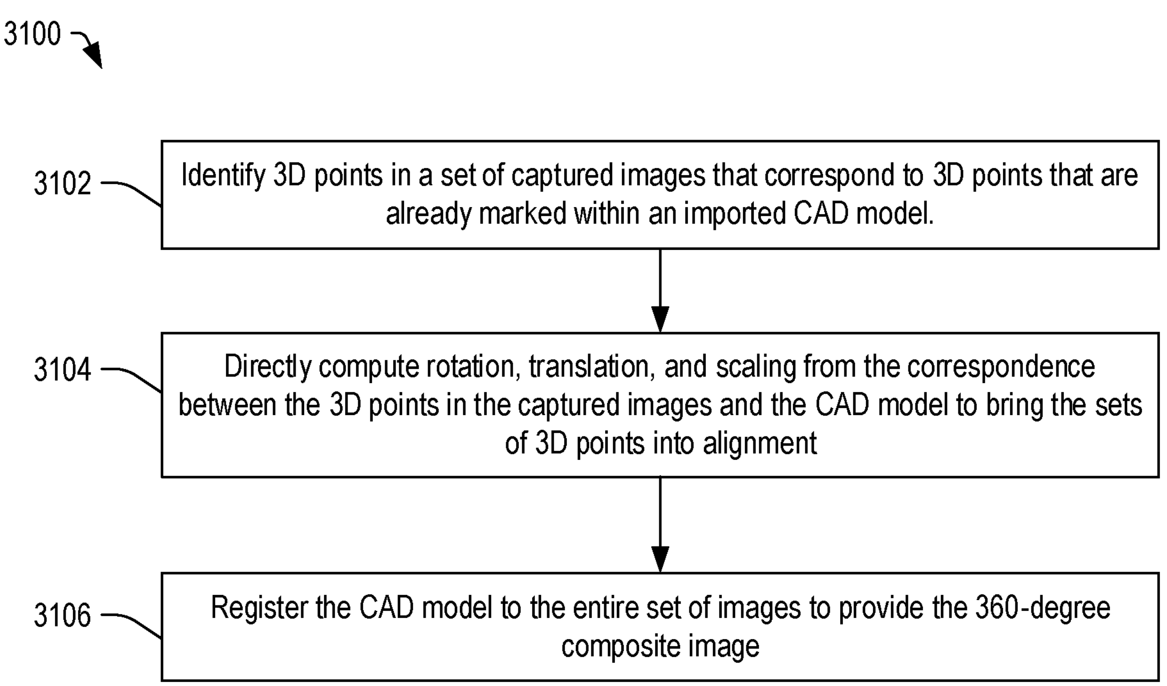
FIG. 31 depicts a flow diagram of a method of providing a 360-degree composite image from a set of images correlated to a three-dimensional CAD model, in accordance with certain embodiments of the present disclosure.

FIG. 31 depicts a flow diagram of a method 3100 of providing a 360-degree composite image from a set of images correlated to a three-dimensional CAD model, in accordance with certain embodiments of the present disclosure. At 3102, the method 3100 can include identifying three-dimensional points in a set of captured images that correspond to three-dimensional points that are already marked within an imported CAD model. The three-dimensional points within the CAD model may have been marked previously.

At 3104, the method 3100 can include directly computing rotation, translation, and scaling from the correspondence between the three-dimensional points in the captured images and the CAD model to bring the sets of three-dimensional points into alignment. At 3106, the method 3100 may include registering the CAD model to the entire set of images to provide the 360-degree composite image.

In an alternative embodiment, the imported CAD model can be aligned to the set of images by using an iterative closest point algorithm to align points sampled from the imported three-dimensional CAD model with the sparse point cloud computed from bundle adjustment (or the dense point cloud derived from subsequent processing as described above). Further, in some embodiments, when an imported three-dimensional CAD model is available, an additional mode of use for the system may include operating without any images at all. In such a case, the system may substitute a live three-dimensional rendering of the imported model in place of captured images, skipping the entire 3D reconstruction and stabilization pipeline but using the same 3D tagging system to store three-dimensional linked vehicle metadata about a specific tag. Other embodiments are also possible.

In the above-discussion, reference has been made to background removal. In some embodiments, given a three-dimensional CAD model that is aligned with the set of images, the triangles or geometric shapes that compose the three-dimensional model can be projected into any of the images. Any pixel of any of the images that is covered by one of the projected geometric shapes can be considered part of the "foreground" and any pixel that is not covered by one of these projected shapes is considered "background." In some embodiments, the goal of background removal may be to obscure background pixels so that only the object of interest remains. For example, the background may include people, signs, other distractions, other unwanted content, or any combination thereof. The system may allow a user to identify and remove background image data, such as by setting all background pixels to a solid color, such as black, white or gray; replacing the background pixels with pixels forming a separate image (for example, of more attractive surroundings); or blurring the background pixels by averaging them together with an appropriate filter.

In certain embodiments, the system may utilize the imported three-dimensional CAD model aligned with the entire set of images to enable a variety of functions associated with the 360-degree composite image. For example, the system may be configured to provide an interface including the three-dimensional model and including one or more user-selectable elements (checkboxes, pulldown menus, and so on). A user may interact with the one or more user-selectable elements to alter particular characteristics of the 360-degree composite images. In a particular example, the user may adjust a paint color of a vehicle or introduce other modifications (such as adding a spoiler to a car), which changes can be updated in real time. In some embodiments, the 3D CAD model may include geometry information as well as a set of labels associated with each polygon indicating the type of surface being represented (e.g., glass window, painted car body, chrome handle or trim, and so on). Thus, the aligned 3D model indicates the pixels in each image that represent a painted surface. In response to a user selection corresponding to a change in paint color, the system may use a combination of image manipulation and three-dimensional computer graphics techniques to change the apparent paint color of the vehicle according to the user input. Further, since the 3D CAD model may contain additional three-dimensional geometry for optional parts not included on every instance of the vehicle in question, by using three-dimensional computer graphics to render these non-existent three-dimensional models on top of the real vehicle imagery, the system may provide a form of augmented reality through which a user can optionally visualize any additional vehicle part option as it would look from every image in the 360-degree composite image.

In certain embodiments, three dimensional tags can be presented as dynamic three-dimensional shapes that can interact with the environment in the images, hovering just over the surface of the vehicle while gently floating back and forth, projecting shadows on the ground and properly being occluded and perspectively distorted as viewed from different parts of the 360-degree capture. Each 3D tag may be associated with extra data, such as text or imagery. When such text or imagery exists, the extra information can be represented in a variety of ways. In one example, the extra information may be represented as a floating three-dimensional overlay within the 360-degree composite image, such that it is anchored to the 3D tag point and rotates with the vehicle. In another example, the extra information may be represented as two-dimensional text and images on the screen with lines, curves, arrows, or any combination thereof, dynamically linking that information to the associated 3D tags as they rotate through the scene. When that same 3D tag becomes occluded and is no longer displayed on the screen, the connecting line may also disappear, but the text may remain on the screen in the same 2D position, while other bits of text may be linked to their corresponding, visible 3D tags.

In some embodiments, a semi-transparent flat ring may be drawn on the ground beneath and surrounding the vehicle, providing an anchor for additional augmented content overlaid on the scene. The ring may provide visual rotation feedback during user interactions. In the absence of a 3D CAD model of the vehicle, the 3D position of the ring may be determined based on a computed ground plane in the scene.

In some embodiments, a the 3D-stabilized 360-degree composite image can be viewed in both virtual reality and augmented reality by mapping the same 3D information used for stabilization (3D center of mass and gravity vector) to a physical position in the augmented or virtual space, such that physically rotating the viewer's position around that center indexes into a succession of appropriate images that replicate the viewing experience when walking around the physical vehicle. Without the 3D stabilization described herein, the virtual reality and augmented reality viewing method doesn't work because it requires a physical, fixed center of rotation around which the user can physically walk. Additionally, in the present method, translational post-processing is not applied to the stabilization for viewing in virtual reality or augmented reality in order to keep the physical center of rotation fixed.

In some embodiments, in the case of a stereoscopic virtual reality or augmented reality headset, the display provided for each eye may be indexed to a different view (based on yaw angle) from the 360-degree image capture, such that the vehicle appears three-dimensional to the user. In some embodiments, this effect may be best perceived when the vehicle is being viewed as a miniature composite image, such that the separation between the user's left and right eyes lead them to index into separate stabilized images from the capture. Alternatively, a large number of images may be captured to enhance the stereoscopic effect at higher magnifications.

When viewing in virtual reality or augmented reality, where the edge of a 2D screen or on-screen 2D frame is no longer an appropriate boundary for an object rotating in 3D, the images can be positioned between two equally sized 3D cylinders that extend upward and downward from the top and bottom of the image, respectively. The diameter of the 3D cylinder is made equal to the width of the floating 3D photograph in space, such that there is always a continuous edge from the top cylinder through the left and right edges of the photograph and down through the edges of the bottom cylinder as viewed from anywhere around the cylinder. The photographs can be oriented toward the user's viewing position, as if spinning on a vertical rod through the center of the cylinders to maintain this relationship. This maintains the illusion of a physical three-dimensional object sandwiched between the top and bottom cylinders. Other embodiments are also possible.

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, in the flow diagrams presented herein, in certain embodiments blocks may be removed, combined, or rearranged without departing from the scope of the disclosure.

Further, in certain embodiments structural and functional elements within the diagrams may be combined, separated, or removed, without departing from the scope of the disclosure. Additionally, certain modules and components may be combined, or split into sub-components. In the various embodiments, functionality assigned to a particular component or module may be handled by another component instead or various functions may be combined into a single module or application. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above examples, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

Although the present invention has been described with reference to preferred embodiments, workers skilled in the art will recognize that changes may be made in form and detail without departing from the scope of the invention.

What is claimed is:

1. A system comprising:

one or more processors; and one or more memories coupled to the one or more processors and including instructions that, when executed by the one or more processors, cause the one or more processors to:

fit one or more planes using a set of camera positions for a surround image of a vehicle;

determine a direction of gravity using the one or more planes; and stabilize one or more images in the surround image of the vehicle using the direction of gravity.

2. The system of claim 1, wherein the instructions further cause the one or more processors to:

receive a selection of a feature on the surround image of the vehicle; and in response to the receiving the selection, rotate the surround image of the vehicle around the feature.

3. The system of claim 2, wherein the surround image of the vehicle is rotated about an axis of rotation extending parallel to the direction of gravity.

4. The system of claim 1, wherein the stabilizing the one or more images comprises aligning one or more feature points across two or more images of the surround image.

5. The system of claim 1 further comprising:

a camera coupled to the one or more processors, wherein the camera is configured to capture the one or more images in the surround image; and a gyroscope sensor coupled to the one or more processors, wherein the gyroscope sensor is configured to provide signals corresponding to the direction of gravity.

6. The system of claim 1, wherein the determine the direction of gravity comprises:

generate one or more normal vectors for the one or more planes; and set at least one of the one or more normal vectors as the direction of gravity.

7. The system of claim 1, wherein the surround image of the vehicle comprises a 360 degree composite image.

8. A method comprising:

fitting, using one or more processors, one or more planes using a set of camera positions for a surround image of a vehicle;

determining, using the one or more processors, a direction of gravity using the one or more planes; and stabilizing, using the one or more processors, one or more images in the surround image of the vehicle using the direction of gravity.

9. The method of claim 8 further comprising:

receiving a selection of a feature on the surround image of the vehicle; and in response to the receiving the selection, rotating the surround image of the vehicle around the feature.

10. The method of claim 9, wherein the surround image of the vehicle is rotated about an axis of rotation extending parallel to the direction of gravity.

11. The method of claim 8, wherein stabilizing the one or more images comprises aligning one or more feature points across two or more images of the surround image.

12. The method of claim 8 further comprising:

capturing the one or more images using a camera coupled to the one or more processors; and receiving signals corresponding to the direction of gravity from a gyroscope sensor.

13. The method of claim 8, wherein the determining the direction of gravity comprises:

generating one or more normal vectors for the one or more planes; and setting at least one of the one or more normal vectors as the direction of gravity.

14. The method of claim 8, wherein the surround image of the vehicle comprises a 360 degree composite image.

15. An article of manufacture including one or more non-transitory, tangible computer readable storage mediums having instructions stored thereon that, in response to execution by one or more processors, cause the one or more processors to perform operations comprising:

fitting one or more planes using a set of camera positions for a surround image of a vehicle;

determining a direction of gravity using the one or more planes; and stabilizing one or more images in the surround image of the vehicle using the direction of gravity.

16. The article of manufacture of claim 15, wherein the operations further comprise:

receiving a selection of a feature on the surround image of the vehicle; and in response to the receiving the selection, rotating the surround image of the vehicle around the feature.

17. The article of manufacture of claim 16, wherein the surround image of the vehicle is rotated about an axis of rotation extending parallel to the direction of gravity.

18. The article of manufacture of claim 15, wherein the stabilizing the one or more images comprises aligning one or more feature points across two or more images of the surround image.

19. The article of manufacture of claim 15, wherein the operations further comprise:

capturing the one or more images using a camera coupled to the one or more processors; and receiving signals corresponding to the direction of gravity from a gyroscope sensor.

20. The article of manufacture of claim 15, wherein the determining the direction of gravity comprises:

generating one or more normal vectors for the one or more planes; and setting at least one of the one or more normal vectors as the direction of gravity.

* * * * *